United States Patent
Ingalls et al.

(10) Patent No.: US 12,199,846 B2
(45) Date of Patent: *Jan. 14, 2025

(54) NETWORK SECURITY MONITORING AND CORRELATION SYSTEM AND METHOD OF USING

(71) Applicant: Viewpoint Software, LLC, Woodworth, LA (US)

(72) Inventors: Jason Ingalls, Woodworth, LA (US); Adam Richards, Bossier City, LA (US); Eugenio Perinelli, Verona (IT); Nicola Piccinelli, Montichiari (IT); Riccardo Arena, Verona (IT)

(73) Assignee: Viewpoint Software, LLC, Woodworth, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,050

(22) Filed: Jun. 30, 2023

(65) Prior Publication Data

US 2023/0344731 A1    Oct. 26, 2023

Related U.S. Application Data

(63) Continuation of application No. 17/196,569, filed on Mar. 9, 2021, now Pat. No. 11,716,266, which is a
(Continued)

(51) Int. Cl.
*H04L 43/045* (2022.01)
*H04L 9/40* (2022.01)
(Continued)

(52) U.S. Cl.
CPC ............ *H04L 43/045* (2013.01); *H04L 41/12* (2013.01); *H04L 41/22* (2013.01); *H04L 43/06* (2013.01);
(Continued)

(58) Field of Classification Search
CPC ....... H04L 43/045; H04L 41/12; H04L 41/22; H04L 43/06; H04L 63/1425
See application file for complete search history.

(56) References Cited

U.S. PATENT DOCUMENTS

| 5,796,942 | A | 8/1998 | Esbensen |
| 5,958,012 | A | 9/1999 | Battat et al. |

(Continued)

FOREIGN PATENT DOCUMENTS

EP        2876842 A1    5/2015

OTHER PUBLICATIONS

Besnik Camaj, Etienne Petremand, Detecting Networks Anomalies and Attacks Using 3D Visualization, Computer Science and Information Technology 3(2): 54-57, 2015, 4 pages.
(Continued)

*Primary Examiner* — Minh Chau Nguyen
(74) *Attorney, Agent, or Firm* — Jones Walker LLP

(57) ABSTRACT

A network security monitoring and correlation system for providing a three-dimensional visualization of network traffic overlaid with security alerts and other relevant discrete data. The system may comprise an application server communicably linked to a client. The server functions to retrieve network traffic metadata and relevant discrete data associated with individual computer hosts and connections in the monitored network, process the network traffic data by building a graph data structure, and then embedding within the graph data structure one or more layers of additional information about the individual computer hosts and connections derived from the discrete data. The client functions to produce a three-dimensional visualization of the network environment by parsing the graph data structure received from the server and then spawning computer hosts and connections in the 3-D environment. The client will then add
(Continued)

the overlay information to the appropriate hosts or connections, with the overlay information preferably being represented within the 3-D environment as a particular color, shape, size, position, or a changing dynamic value.

20 Claims, 35 Drawing Sheets

Related U.S. Application Data continuation of application No. 15/750,074, filed as application No. PCT/US2016/045399 on Aug. 3, 2016, now Pat. No. 10,965,561.

(60) Provisional application No. 62/200,510, filed on Aug. 3, 2015.

(51) Int. Cl.
H04L 41/12 (2022.01)
H04L 41/22 (2022.01)
H04L 43/06 (2022.01)
H04L 43/12 (2022.01)

(52) U.S. Cl.
CPC .......... *H04L 43/12* (2013.01); *H04L 63/1425* (2013.01)

(56) References Cited

U.S. PATENT DOCUMENTS

| | | | |
|---|---|---|---|
| 7,180,516 B2 | 2/2007 | Kapler et al. | |
| 7,681,131 B1 | 3/2010 | Quarterman et al. | |
| 7,877,804 B2 | 1/2011 | Khanolkar et al. | |
| 7,890,869 B1 | 2/2011 | Mayer et al. | |
| 7,940,271 B2 | 5/2011 | Wright et al. | |
| 8,019,865 B2 | 9/2011 | Chang et al. | |
| 8,245,302 B2 | 8/2012 | Evans et al. | |
| 8,782,265 B1 | 7/2014 | Bokotey | |
| 8,803,884 B2 | 8/2014 | Bradshaw et al. | |
| 9,130,981 B2 | 9/2015 | Yi | |
| 2008/0123586 A1 | 5/2008 | Manser | |
| 2011/0084967 A1* | 4/2011 | De Pauw | G06F 3/0481 715/830 |
| 2011/0277034 A1* | 11/2011 | Hanson | G06F 21/554 709/224 |
| 2013/0227714 A1* | 8/2013 | Gula | H04L 63/1408 726/32 |
| 2014/0096036 A1 | 4/2014 | Mohler | |
| 2014/0336785 A1 | 11/2014 | Asenjo et al. | |
| 2014/0365647 A1* | 12/2014 | Haraszti | H04L 41/12 709/224 |
| 2015/0149611 A1 | 5/2015 | Lissack | |
| 2016/0253710 A1 | 9/2016 | Publicover et al. | |

OTHER PUBLICATIONS

Doantam Phan, Supporting the Visualization and Forensic Analysis of Network Events, A dissertation submitted to the Department of Computer Science and the Committee on Graduate Studies of Stanford University in partial fulfillment of the requirements for the degree of Doctor of Philosophy, Dec. 2007, 128 pges.

John R. Goodall, Introduction to Visualization for Computer Security, Introduction to Visualization for Computer Security, VizSEC 2007, Mathematics and Visualization, Springer, Berlin, Heidelberg, 17 pages.

Kulsoom Abdullah, Chris Lee, Gregory Conti, John A. Copeland, John Stasko, IDS RainStorm: Visualizing IDS Alarms, VizSEC, 2005, 10 pages.

ISA/US, Search Report, PCT/US2016/045399 dated Oct. 17, 2016, 3 pages.

Larry Bunch, Jeffrey M. Bradshaw, Robert R. Hoffman, Matthew Johnson, Principles for Human-Centered Interaction Design, Part 2: Can Humans and Machines Think Together?; IEEE Intelligent Systems; Published by the IEEE Computer Society; May/Jun. 2015; 8 pages.

EPO, Search Report, Application No. 16833821.8 based on PCT/US2016/045399, dated Feb. 13, 2019; 11 pages.

* cited by examiner

| ALERT DETAILS (20) | | | | |
|---|---|---|---|---|
| SOURCE (21) | DESTINATION (22) | | | |
| 192.100.101.58 | 192.100.100.211 | 32 | | ✓ |
| 192.100.101.38 | 192.100.100.211 | 32 | | ✓ |
| 10.3.2.51 | 192.100.100.207 | 32 | | ✓ |
| 192.100.100.212 | 192.243.232.7 | 32 | | ✓ |
| 10.1.2.50 | 131.253.14.195 | 32 | | ✓ |
| 192.100.101.51 | 192.100.100.211 | 32 | | ✓ |
| 192.100.101.51 | 54.210.211.165 | 32 | | ✓ |
| 192.100.100.212 | 184.26.61.26 | 32 | | ✓ |

IGNORE ✓   TUNE ⊘   ESCALATE ⌖

| NEIGHBOURS OF | 172.18.17.13 |
|---|---|

| | |
|---|---|
| 10.16.2.4 | |
| 172.18.17.13 | |
| 66.150.157.192 | |
| 172.217.1.140 | |

| C.O.I | − | 2 | + |
|---|---|---|---|

*FIG. 14C*

NETWORK SECURITY MONITORING AND CORRELATION SYSTEM AND METHOD OF USING

CROSS-REFERENCE TO RELATED APPLICATION

This application is a continuation of U.S. Ser. No. 17/196,569 filed on Mar. 9, 2021, which is a continuation of U.S. Ser. No. 15/750,074 filed on Feb. 2, 2018, which is a 371 national phase application from PCT/US2016/045399, filed on Aug. 3, 2016, which claims the benefit of U.S. Provisional Application No. 62/200,510 filed Aug. 3, 2015, all of which are hereby incorporated by reference in their entirety.

BACKGROUND

Networked computers connected via the Internet are subject to intrusion attempts on a regular basis. Due to the exponential increase in network connections, intrusion attempts via automated attack tools, and other network events that share exponential growth characteristics as computer networks grow in size and complexity, current network monitoring systems and methods are limited in their ability to present enough information concurrently to human analysts. This limiting factor in computer security analysis results in several negative performance impacts.

First, existing security monitoring systems typically present information to analysts in two-dimensional data visualizations, primarily in spreadsheet format. Due to the vast number of alerts and data present in any network of considerable size, and the relatively small display area available to present information, analysts can only see a very small amount of data at a time when performing a security analysis.

Second, existing security monitoring systems are significantly limited in presenting a correlation of security event data between multiple systems and over periods of time. Analysts are required to mentally visualize multiple events in order to properly assess the larger security state. For example, security threats can oftentimes come in the form of unauthorized access of multiple computers by multiple users. However, due to the limitations of existing security monitoring systems, the onus is on the human analyst to visualize the security event and understand the environment and context within which it occurred.

Third, in order to properly prioritize and respond to computer security events, human analysts must have both experience in information security and knowledge of the computer network environment. As intrusion attempts and the complexity of networks escalate, the job qualifications of security analysts correspondingly increase, resulting in a shortage of qualified analysts in the workforce.

SUMMARY OF THE INVENTION

The network security monitoring and correlation system of the present invention utilizes mixed reality techniques to display contextual and prioritized data visualization schemes, thereby allowing a human analyst to quickly inspect and understand the environment surrounding computer hosts within a monitored network. In a preferred embodiment, the system is designed to provide contextual and intuitive visualization of security data in order to prioritize security response activity. By providing a three-dimensional visualization of network traffic overlaid with security alerts and other relevant discrete data, the system can display exponentially more usable data to human analysts than prior art systems. The system effectively visualizes the network environment for the analyst, thereby providing the proper context of security events so that the analyst can develop an appropriate response for addressing any intrusion(s).

A network security monitoring and correlation system embodying features of the present invention may comprise an application server communicably linked to a client. The server functions to retrieve network traffic metadata and relevant discrete data. The server will process the data by building a graph data structure using the network traffic metadata and then embedding within the graph data structure one or more layers of additional information derived from the network metadata and the discrete data about individual computer hosts and connections active within the monitored network. In a preferred embodiment, the application server may comprise a retrieval engine module for retrieving the collected network traffic metadata and relevant discrete data, a graph generator module for processing the retrieved network metadata and building the graph data structure, and an overlay generator module for cooperating with the graph generator to embed the additional information into the graph data structure.

The client functions to produce a three-dimensional visualization of the network environment by parsing the graph data structure received from the server. The client will spawn computer hosts and connections in the 3-D environment using the network traffic metadata and relevant discrete data organized within the graph data structure, assigning a three-dimensional object to both the hosts and connections. The client will then add the overlay information to the appropriate hosts or connections, with the overlay information preferably being represented within the 3-D environment as a particular color, shape, size, position, or a changing dynamic value. The network traffic and overlay information can then be visualized in the three-dimensional environment. In a preferred embodiment, the client can comprise a network worker module for handling communications and the transfer of data between the client and the server, a 3-D object generator module for creating the three-dimensional environment, a communicator module for spawning nodes and connections within the three-dimensional environment, movement and layout modules, and a mixed reality graphical user interface.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to illustrate further various embodiments and to explain various principles and advantages in accordance with the present invention:

FIG. 1g is an illustration of an embodiment of a graphical user interface showing a listing of alerts existing within the monitored network environment.

FIG. 2g depicts yet another exemplary embodiment of a graphical user interface screen that allows for the adjustment of the filter settings and/or the appearance settings of the system.

FIG. 14b is an illustration of an embodiment of a graphical user interface showing a listing of primary connections for the selected computer host depicted in FIG. 14a.

FIG. 14c is an illustration of an embodiment of a graphical user interface showing the secondary connections (i.e., indirect connections through one of the primary connections) for the selected computer host depicted in FIG. 14a.

DETAILED DESCRIPTION

Figure 1A:
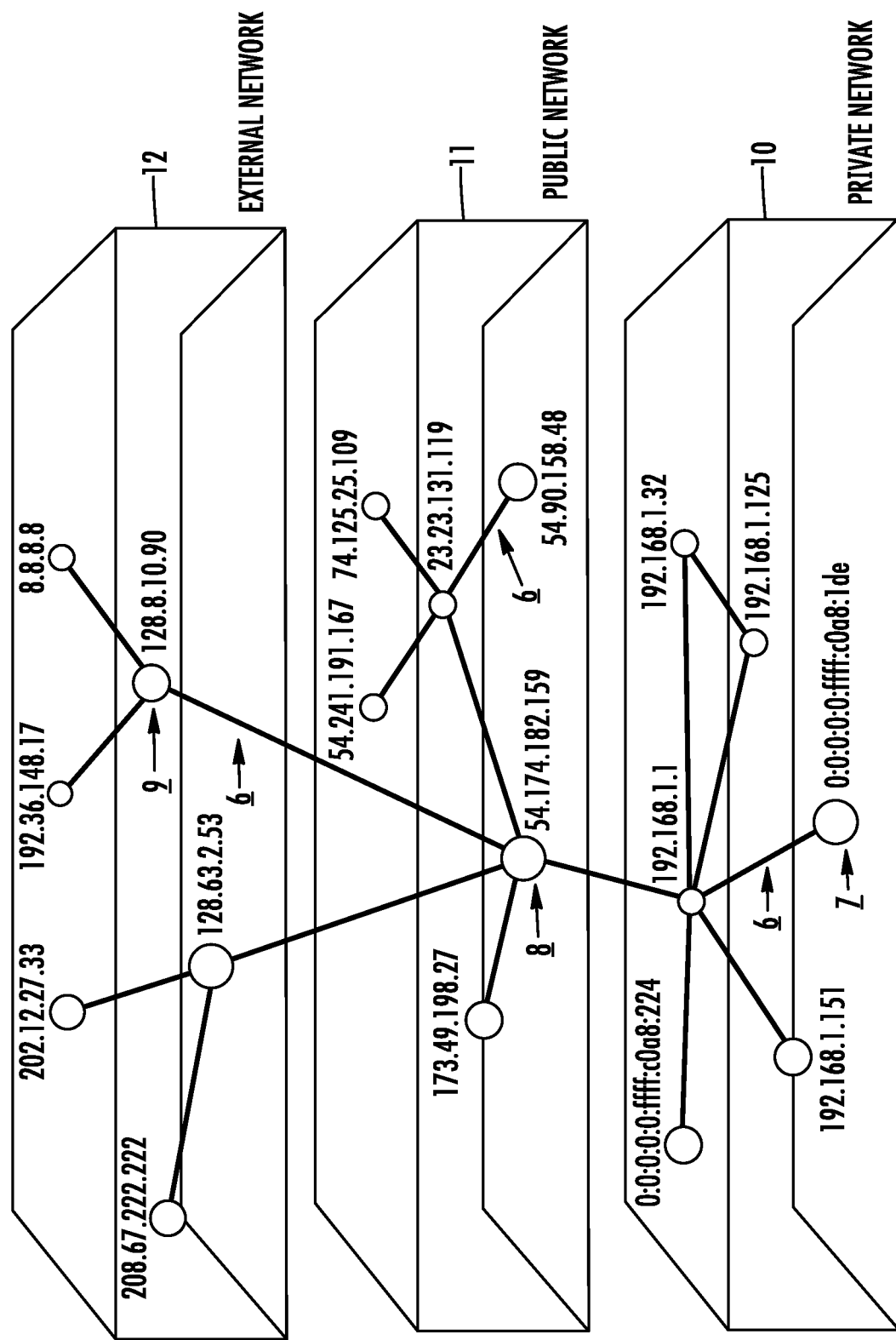
FIG. 1a is an illustration of an exemplary "sandwich" or "layered" 3-D mixed reality environment generated by the network security monitoring and correlation system of the present invention.

A network security monitoring and correlation system utilizing mixed reality techniques is described herein.

Detailed embodiments of the present invention are disclosed; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed environment. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

The network security monitoring and correlation system of the present invention utilizes mixed reality techniques to present a three-dimensional depiction of the network activity that can be overlaid with security alerts and/or other relevant discrete data (sometimes referred to herein as "discrete overlay data"). The discrete overlay data includes any data useful for being superimposed over the network traffic. In certain embodiments, the discrete data may include alert data, user access data, endpoint data, and threat intelligence data. The system allows a human analyst to quickly inspect and understand the environment of the monitored network. The term mixed reality, as used herein, is meant to encompass the use of virtual reality visualization systems and interfaces, augmented reality visualization systems and interfaces, and real visual display systems and interfaces, such as monitors and keyboards.

The system can present each type of network traffic data as a particular three-dimensional object—such as spheres, cubes, pipes, or other 3-D objects. Attributes of the network traffic data can be distinguished in the 3-D environment by a particular color, size, position, or changing dynamic values of these three-dimensional objects. Meanwhile, network security alerts and other relevant discrete data can be represented within the 3-D environment as a particular color, shape, size, position, or a changing dynamic value (e.g., flash, pulse, spin, etc.).

FIGS. 1a-1g depict various schemes that can be utilized by the system 1 for displaying the network environment overlaid with additional information derived from data collectors such as intrusion detection systems (IDS's), log aggregators, antivirus applications, and cyber-threat intelligence feeds. For example, FIG. 1a is an illustration of an exemplary "sandwich" or "layered" 3-D mixed reality environment generated by the system of the present invention. The private nodes 7 (i.e., those nodes in the private network) are positioned in a first section 10, the public nodes 8 (i.e., those nodes in the public network) are positioned in a second section 11 disposed spatially above the first section 10, and the external nodes 9 (i.e., those nodes in the external network) are positioned in a third section 12 disposed spatially above the second section 11. Connections 6 between the nodes can be displayed as lines or pipes having variable dimensions proportional to the volume of data.

Figure 1B:
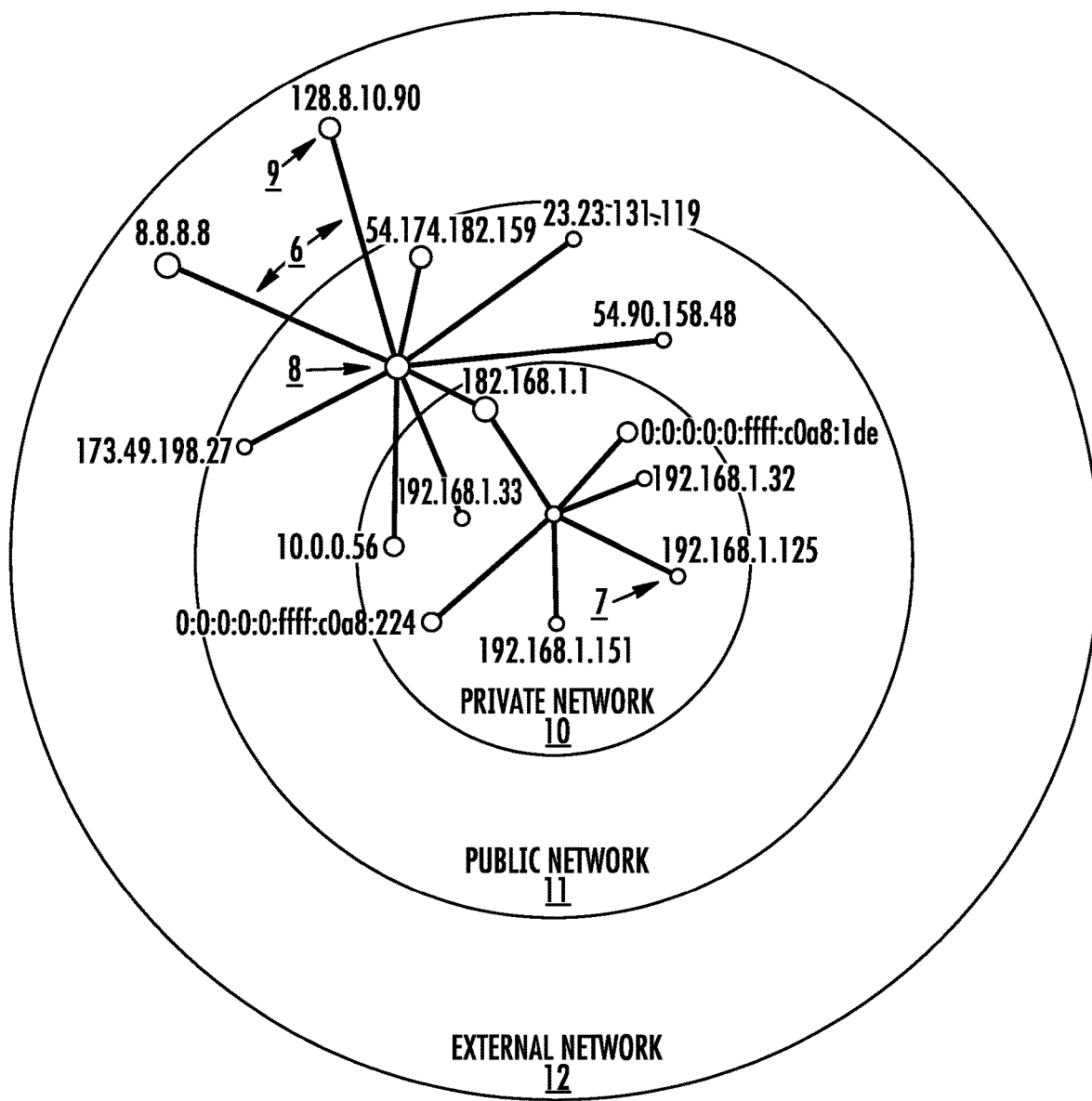
FIG. 1b is an illustration of an exemplary "onion" 3-D mixed reality environment generated by the network security monitoring and correlation system of the present invention.
Figure 1C:
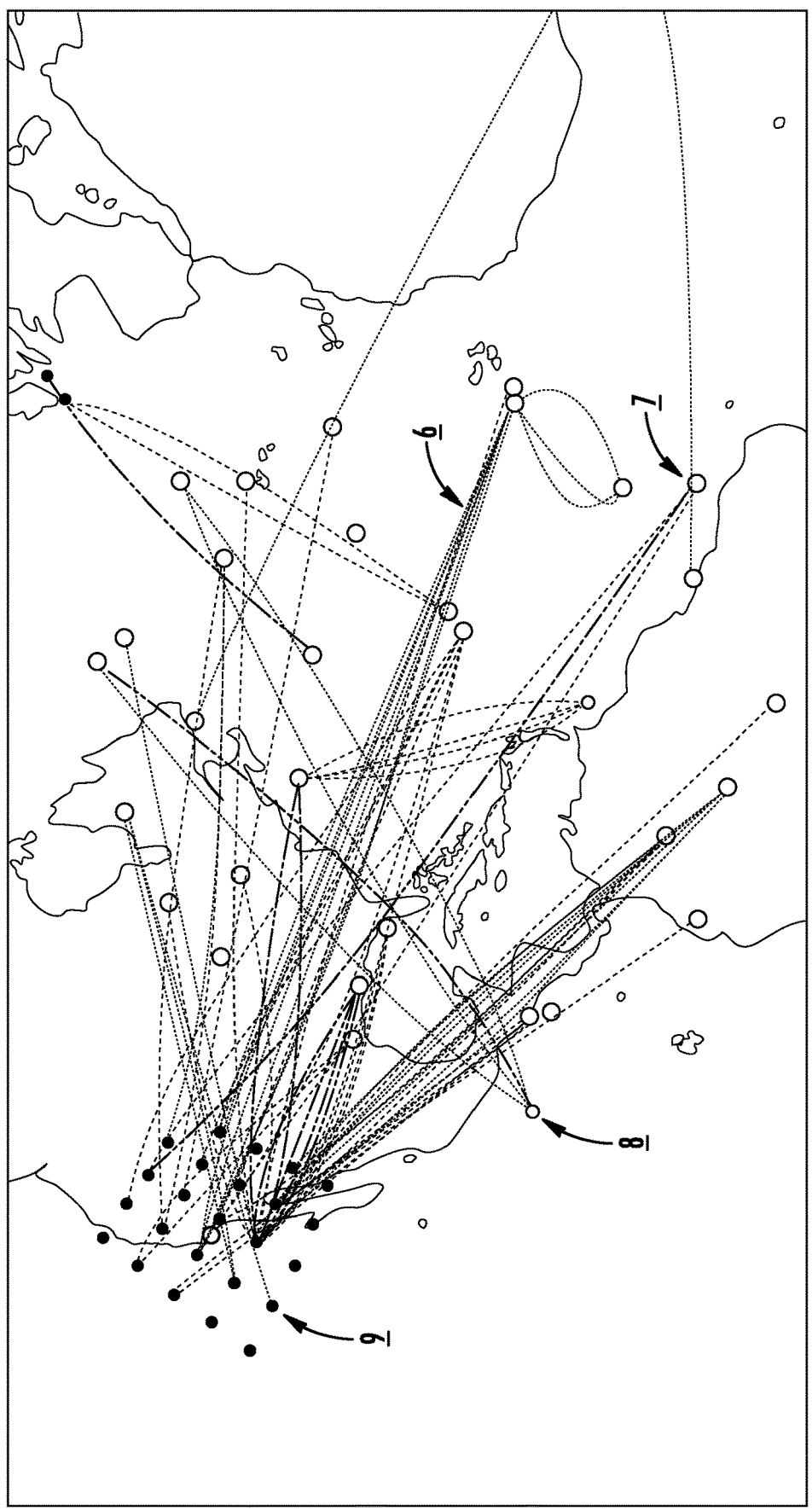
FIG. 1c is another illustration of an exemplary "onion" 3-D mixed reality environment generated by the network security monitoring and correlation system of the present invention.

By way of another example, FIG. 1b is an illustration of an exemplary "onion" 3-D mixed reality environment generated by the system of the present invention. The onion layout consists of three concentric spheres, with the private nodes 7 being positioned in the inner sphere 10, the public nodes 8 being positioned in the middle sphere 11, and the external nodes 9 being positioned in the outer sphere 12.

FIGS. 1c-1g depict a preferred embodiment of the onion layout rendered in a 3-D environment, whereby a map of the world is projected onto an interior surface of a three-dimensional sphere. The analyst's default position for analyzing the network is within the sphere. A 3-D peripheral device, such as a virtual reality head-mounted display, is ideally suited for navigating the 3-D environment. The network traffic is displayed within the sphere as follows. The private nodes 7—which represent computer hosts in the monitored network—are preferably clustered proximate to the center of the sphere. The analyst, whose default position within the 3-D environment is also at the center of the sphere, will perceive these private nodes as being proximate to the analyst. External nodes 9 are positioned on the map of the world according to their geolocation, with their geolocation being derived from the network traffic metadata. Meanwhile, public nodes 8 are spatially positioned between the center of the sphere and the sphere's interior surface. Connectivity between the nodes are preferably displayed as pipes 6 having variable dimensions proportional to the volume of data, with superimposed arrows indicating the flow of data between the private, public, and external hosts 7, 8, 9. The analyst, when at its default position, will perceive the public nodes and external nodes as being more distal to the analyst as compared to the private nodes. Thus, if an analyst wishes to trace a connection from a private node to an external node geolocated on the sphere's interior surface, the analyst will experience the sensation of traveling through space towards the projected map.

Figure 1D:
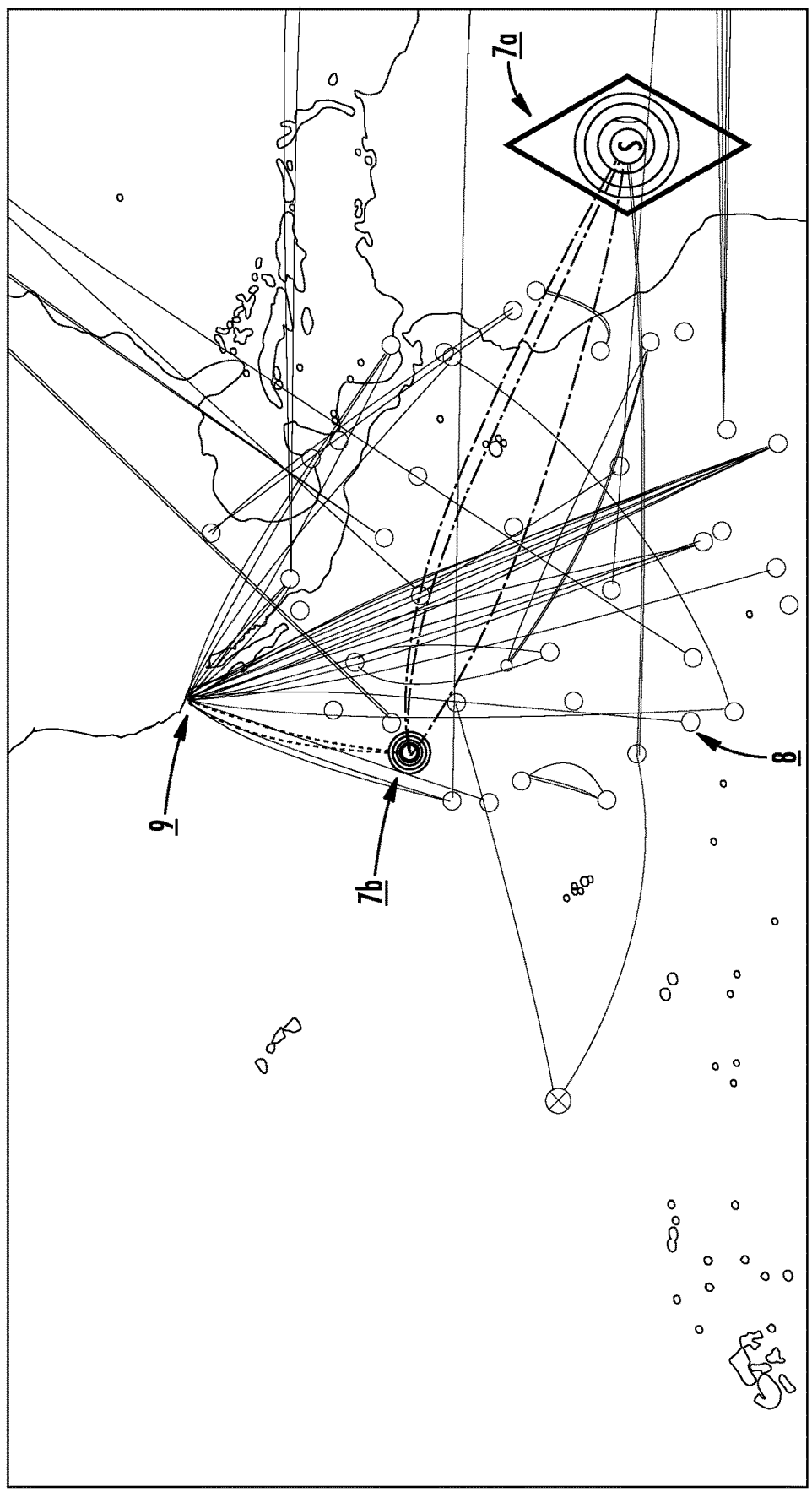
FIG. 1d is an illustration of the "onion" 3-D mixed reality environment depicted in FIG. 1c, whereby a node is shown having a security alert associated with it.
Figure 1E:
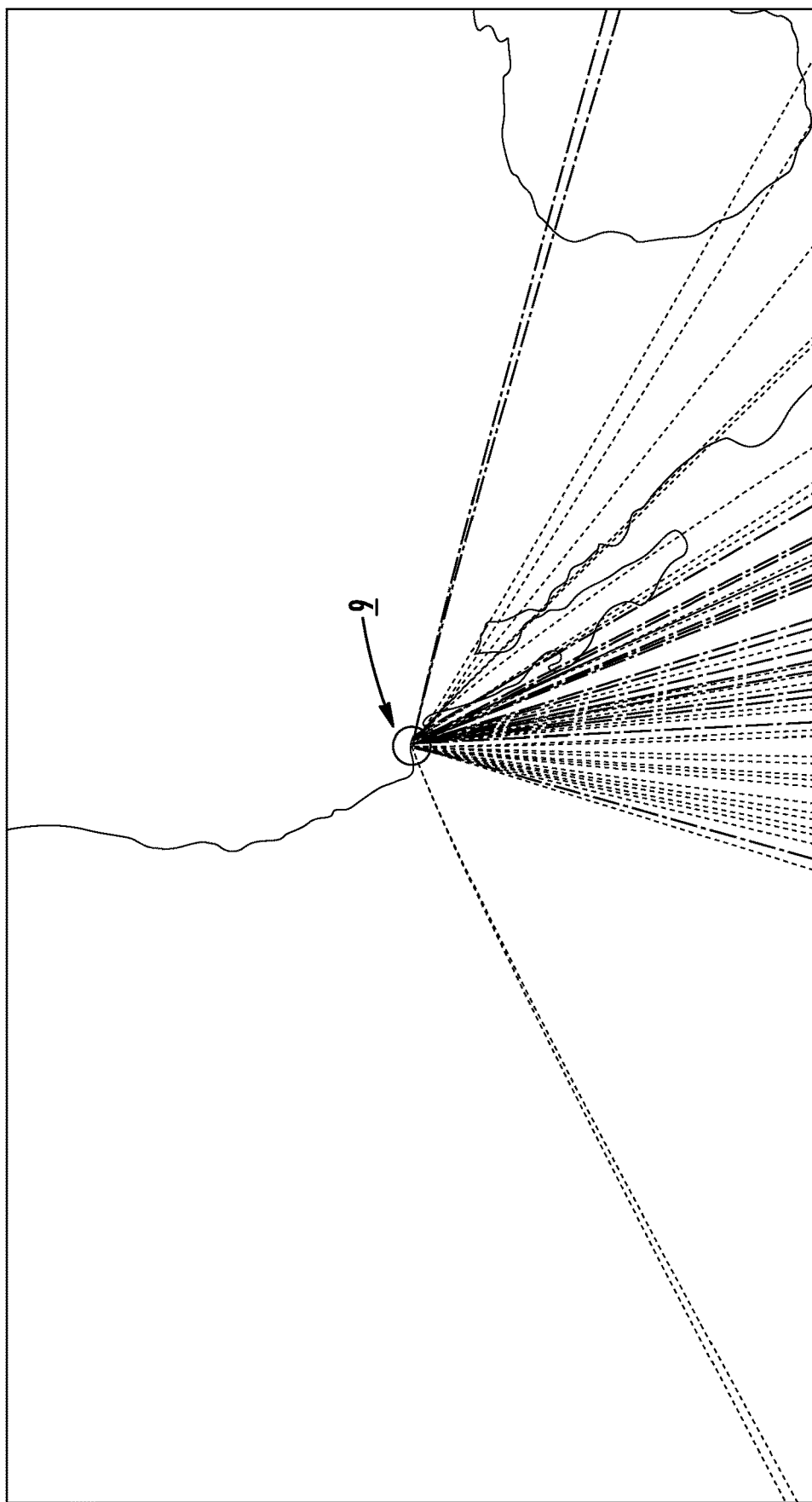
FIG. 1e is an illustration of the "onion" 3-D mixed reality environment depicted in FIG. 1c, illustrating the concentration of external nodes into a singular point on the projected map to declutter the 3-D environment.
Figure 1F:
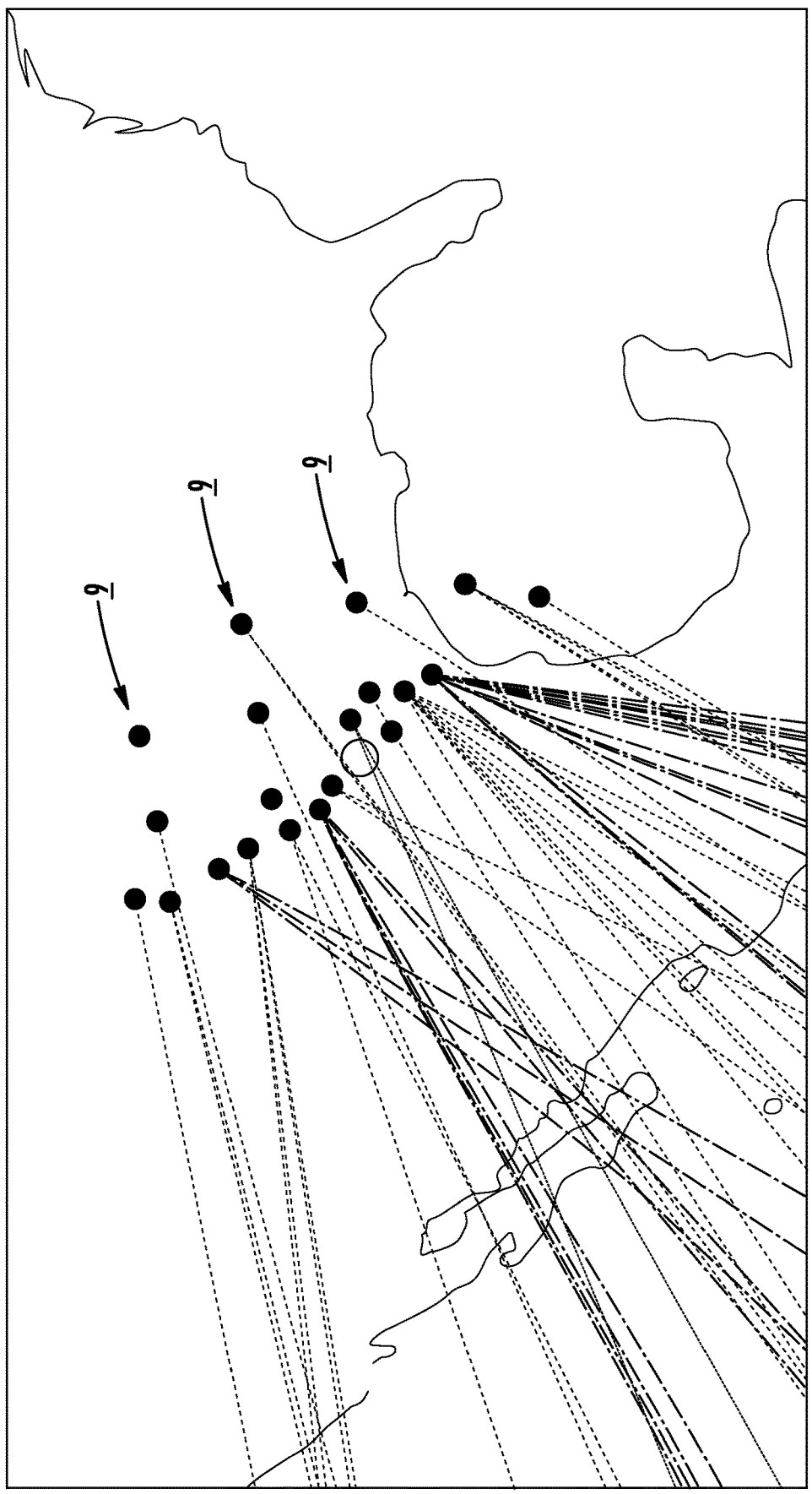
FIG. 1f is an illustration of the "onion" 3-D mixed reality environment depicted in FIG. 1c, illustrating external nodes geolocated within the 3-D environment.

Referring now to FIG. 1d, a private node 7a is shown as having a security alert associated with it. The system of the present invention allows an analyst to visually inspect the environment surrounding the computer host(s) associated with a security alert and quickly take the appropriate remedial action. For example, as shown in FIGS. 1e and 1f, the system allows an analyst to trace the private node's connections to external nodes 9 that are geolocated on the projected map of the earth. In instances where numerous external nodes are active in the monitored network, the system 1 will condense these nodes into a singular point on the projected map to declutter the 3D environment (see FIG. 1e). However, when an analyst desires to visually inspect the connections to specific external nodes associated with the security alert, the system 1 allows an analyst to explode the condensed nodes, thereby showing each external node 9 at its specific geolocation on the projected map (see FIG. 1f).

In addition to visually examining the network environment surrounding security alerts, the system 1 can also provide a listing of alerts existing within the monitored network environment. In FIG. 1g, an embodiment of an alert details interface 20 is shown. The alert details interface 20 can include a source host identifier list 21 and a destination host identifier list 22 consisting of the source host IP address and the destination host IP address for each computer host associated with each alert.

Figure 2A:
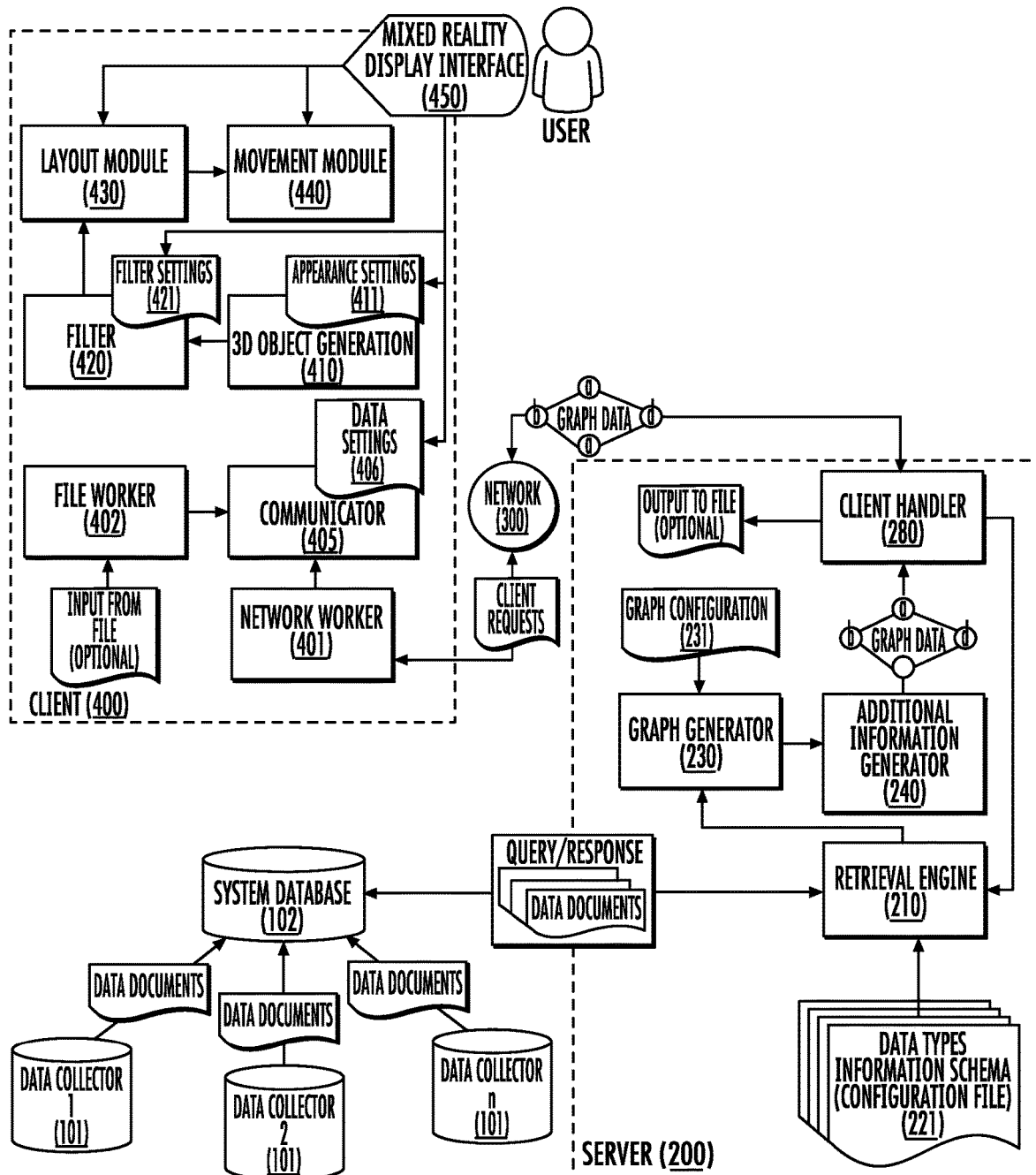
FIG. 2a is a is a block diagram illustrating the environment in which an embodiment of the network security monitoring and correlation system operates, showing how information can be stored, processed, and communicated within the system.

FIG. 2a is a block diagram illustrating the environment in which an embodiment of system 1 of the present invention can operate. In a preferred embodiment, the system 1 works as a server-client model to allow for scalability. However, in alternative embodiments, the system 1 could be employed on a single workstation, or it could be provided as a cloud-based solution whereby the system components and routines are accessed via the Internet by an analyst using a personal computer, mobile computing device, etc.

Referring to FIG. 2a, the network security monitoring and correlation system 1 can comprise a one or more data collectors 101, a system database 102, an application server 200, and a client 400.

The data collectors 101 function to collect network traffic metadata and discrete data. The network metadata is used for creating a three-dimensional visualization of network traffic by the system 1. The discrete data includes specific, descriptive data about the content (the hosts and connections) of the network metadata activity used to generate the 3-D environment. The discrete data can be separated into various visualization layers by the system 1. In certain embodiments, discrete data layers may include cybersecurity alert data, user access data, endpoint data, and threat intelligence data, and any other discrete data layers available in the system database 102. A variety of data collectors 101 or sensors—such as such as network traffic collectors, intrusion detection systems (IDS's), log aggregators, antivirus applications, and cyber-threat intelligence feeds—can be employed for continuous, real-time collection of the relevant metadata and discrete overlay data. In certain embodiments, the data collectors 101 can be executed on separate network hosts on the administrative network. In other embodiments, the data collectors 101 can be integrated into the application server 200.

The system database 102 stores the metadata and discrete data collected by the data collectors 101. In a preferred embodiment, the system database 102 is a non-relational (NoSQL) database, with all data preferably being stored in the system database 102 as documents—a data storage format whereby the data is stored as a collection of key-value pairs that can be queried, and subdivided into listings of types, based on the contents. The data collected by the system 1 is generally divided into two classes: network traffic metadata and discrete data. Each network traffic metadata document will contain metadata regarding a connection between two computer hosts, while each discrete data document will contain specific data that is either actual content—or describes actual content—about a particular event (e.g., alerts, user access, etc.) that occurred in relation to a host or connection within the query set timeframe. In other embodiments, relational databases or other database formats may be utilized. A single system database 102 can be utilized with the system 1, or alternatively, multiple system databases 102 may be employed. The system database 102 can be a separate host on the administrative network, or alternatively, the system database 102 can be integrated into the application server 200.

The server 200 retrieves unstructured data from the system database 102 within a specified time interval through a set of database queries. The server 200 then processes this unstructured data and produces a snapshot—a graph data structure that contains the network metadata and discrete data necessary for populating and visualizing the network environment. The snapshot graph structure is utilized by the client 400 to generate and populate the 3-D environment.

Figure 2B:
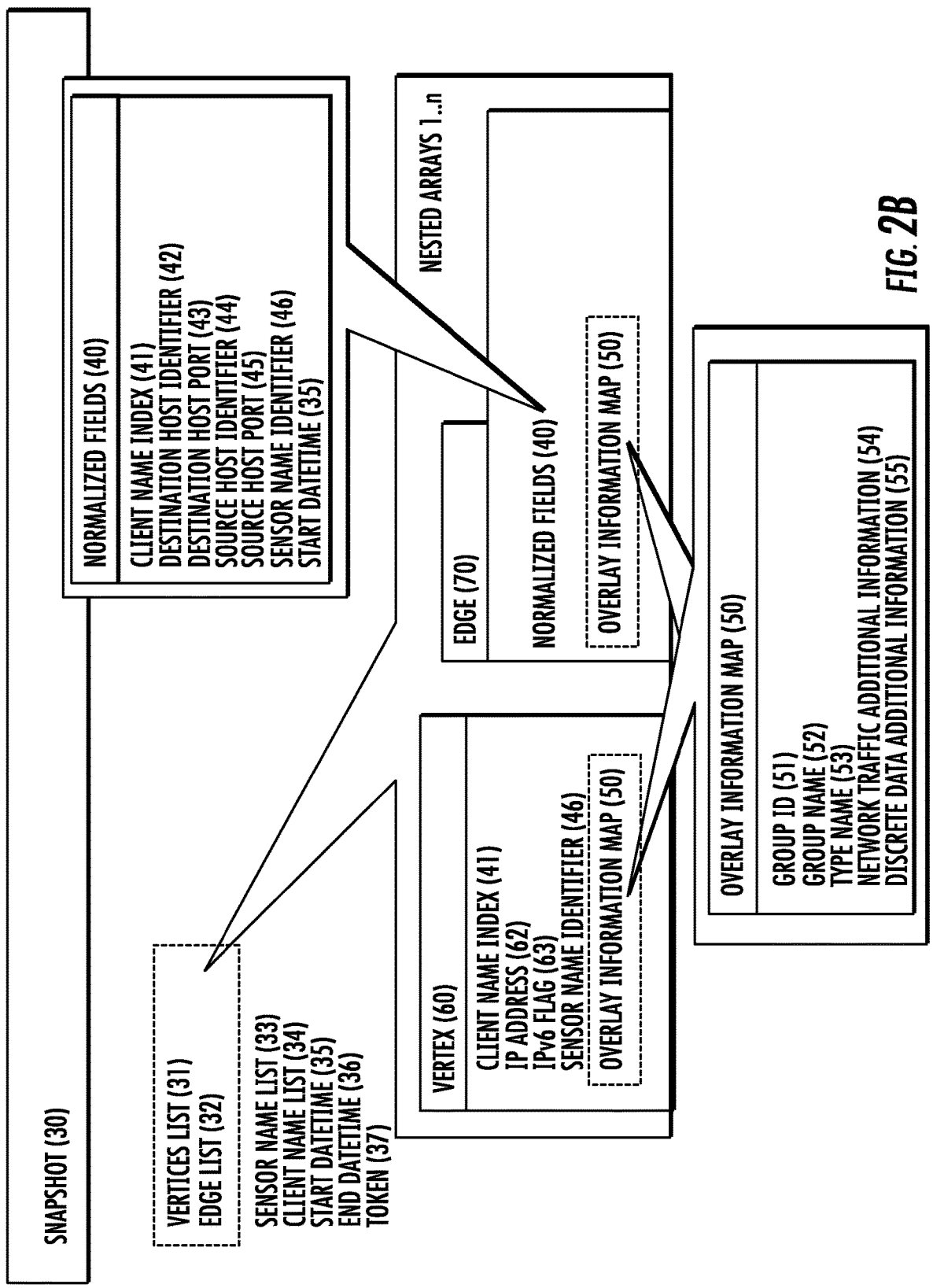
FIG. 2b depicts various types of data that can be collected and utilized by the network security monitoring and correlation system of the present invention to construct a graph data structure used to organize the collected network traffic metadata and discrete data.

FIG. 2b illustrates the composition of a snapshot 30 data structure. The snapshot 30 is comprised of network traffic metadata and discrete data collected during the snapshot timeframe, which is the time period defined by the start date time 35 and the snapshot end date time 36. The snapshot 30 is organized in a graph data structure which contains a vertices list 31 and an edge list 32. Each vertex 60 in the vertices list 31 represents an individual computer host that was recorded in the network traffic metadata during the snapshot timeframe. Meanwhile, each edge 70 in the edge list 32 represents a connection between two computer hosts (i.e., vertices) that was recorded in the network traffic metadata during the snapshot timeframe. The snapshot 30 further comprises a sensor name index list 33, which is a listing of all sensors which have identified the computer hosts and connections in the network traffic. A token 37 can also be utilized as a mechanism for authentication before transmitting the snapshot to a particular client 400.

Figure 2C:
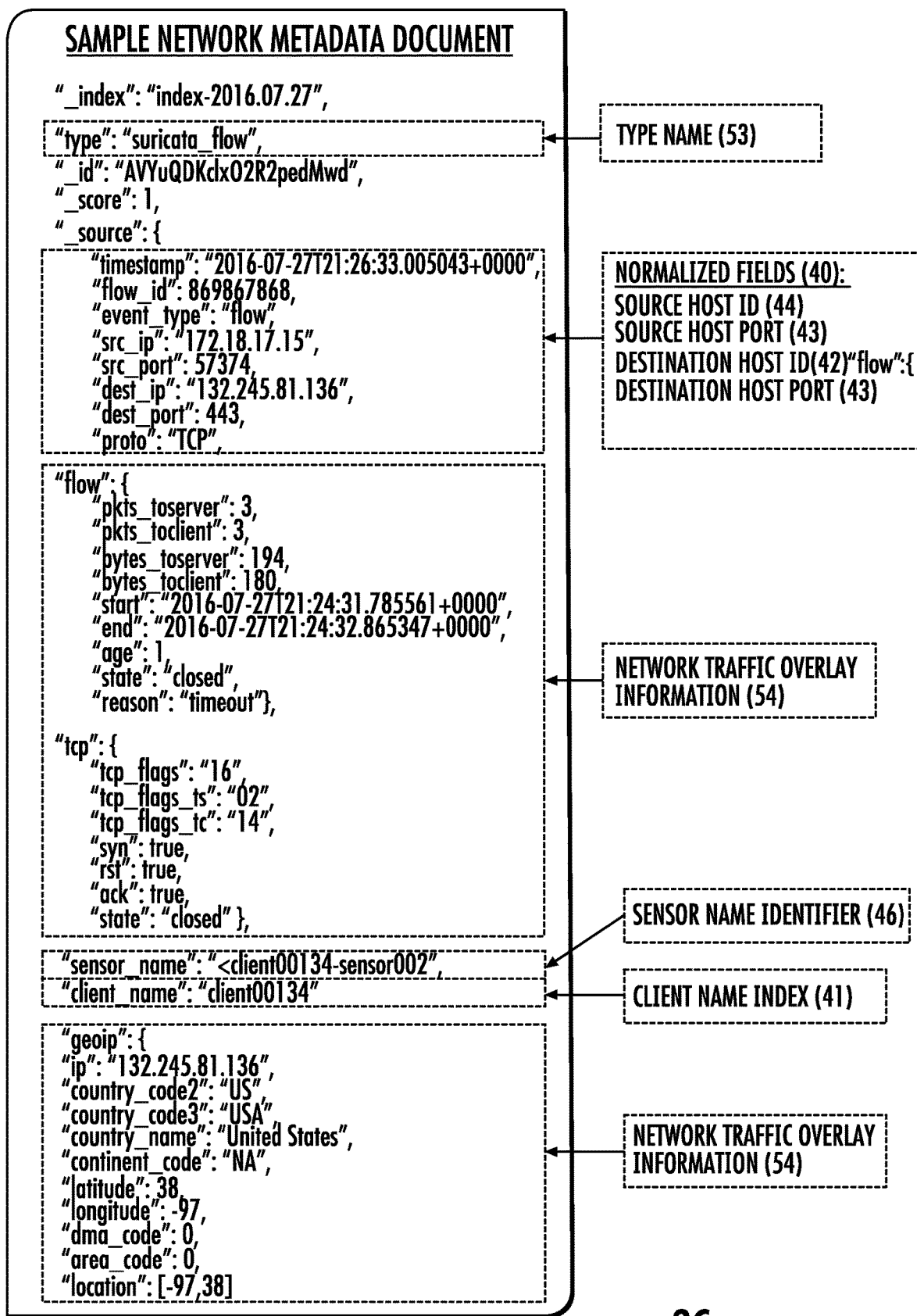
FIG. 2c depicts the composition of an exemplary network traffic metadata document collected and processed by the network security monitoring and correlation system of the present invention.

In order to build an edge in the graph data structure, the system 1 may utilize normalized fields 40—metadata types derived from the network traffic metadata documents present in the system database 102 for the snapshot timeframe and which are required to accurately portray each network connection in the 3-D environment. The normalized fields 40 include the client name index 41; the destination host identifier 42 (e.g., the destination IP address); the destination host port 43, the source host identifier 44 (e.g., the source host IP address); the source host port 45; the sensor name identifier 46; and the start datetime 35. In order to build a vertex in the graph data structure, the system 1 will utilize metadata types derived from the network traffic metadata documents which are required to accurately portray each computer host in the 3-D environment, namely the client name index 41, the IP address 62, the IPv6 flag 63 (i.e., which identifies the internet protocol version of the IP address), and the sensor name identifier 46 (i.e., the sensor which collected the data). An exemplary network traffic metadata document is shown in FIG. 2c.

Figure 2D:
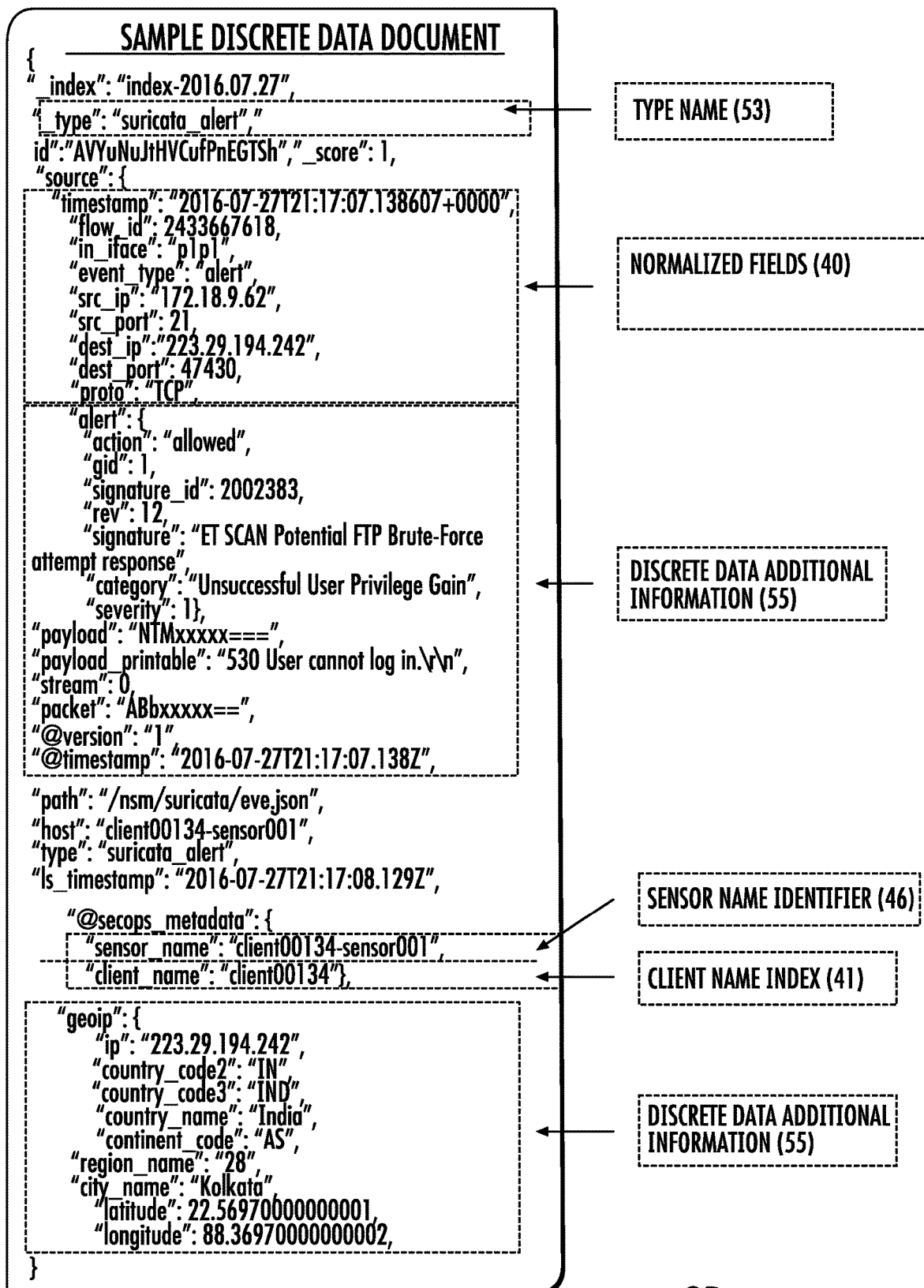
FIG. 2d depicts the composition of an exemplary discrete data document collected and processed by the network security monitoring and correlation system of the present invention.

Once the graph data structure is generated, the system 1 will overlay each vertex and each connection in the graph data structure with one or more layers of network traffic additional information 54 and, if available, with one or more layers of discrete data additional information 55. The network traffic additional information 54 consists of non-normalized network traffic metadata derived from the network data documents and organized within the overlay information map 50. The discrete data additional information 55 consists of additional information (e.g., intrusion alerts) about computer hosts and connections derived from the discrete data and organized within the overlay information map 50. An exemplary IDS alert discrete data document is shown in FIG. 2d.

The overlay information map 50 is used to organize the additional information 54, 55 before it is embedded into the graph data structure. In a preferred embodiment, the discrete data and non-normalized traffic metadata is organized within the overlay information map 50 by a group ID 51 (i.e., an integer assigned to a particular overlay data layer); a group name 52; and document type name 53. For example, in a preferred embodiment, the scheme 221 is configured to assign the following group IDs 51, group names 52, and type names 54 to the following additional information documents:

Network traffic: (ID=Overlay Layer 0; name=connection; type: suricata_flow);
IDS alert: (ID=Overlay Layer 1; name=alert; type: suricata_alert);
Application data (ID=Overlay Layer 2; name=endpoint; type: norton_antivirus);
User access data (ID=Overlay Layer 3; name=user; type: uam_log); and
Threat intelligence (ID=Overlay Layer 4; name=intel; type: symantec_intel).

Figure 6A:
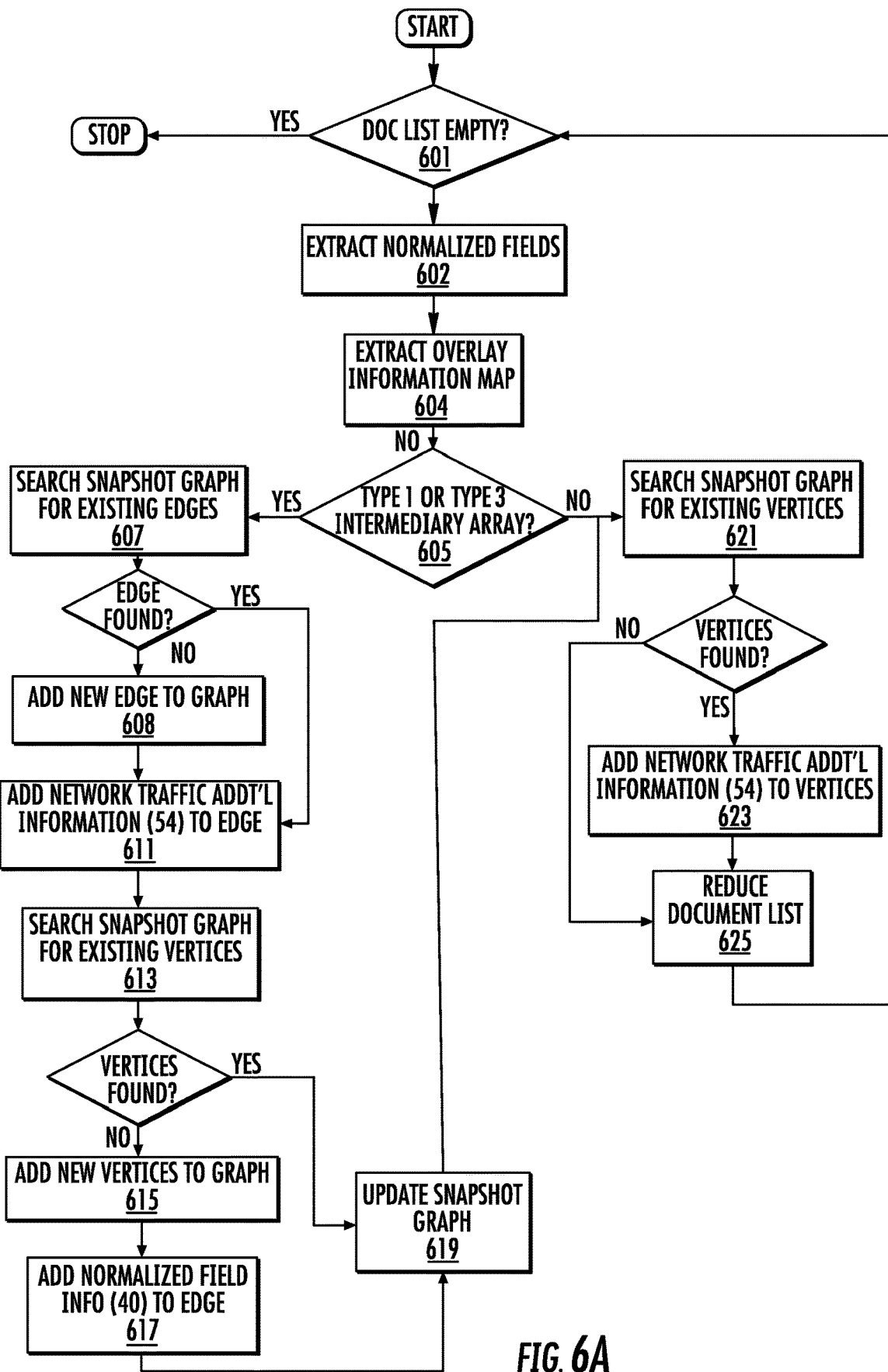
FIG. 6a is a flow diagram depicting an exemplary process for constructing a graph data structure using the collected network traffic metadata.
Figure 6B:
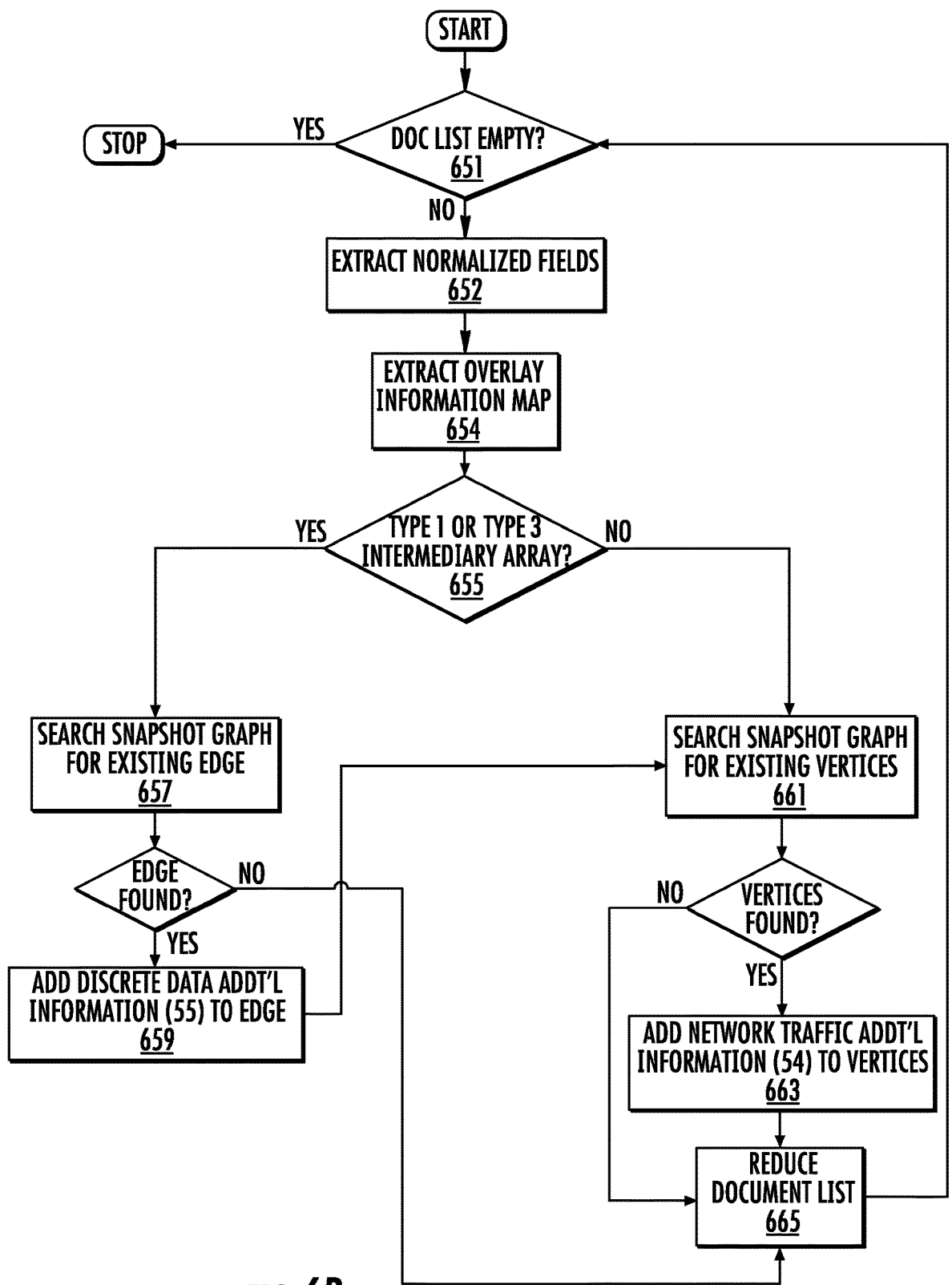
FIG. 6b is a flow diagram depicting an exemplary process for overlaying the graph data structure with additional information derived from the discrete data.

An exemplary process of creating the graph data structure and overlaying the network traffic additional information 54 is shown in FIG. 6a. An exemplary process of overlaying the discrete data additional information 55 is shown in FIG. 6b.

The depicted metadata and discrete data types in FIG. 2b through FIG. 2d are not exhaustive. One skilled in the art will readily recognize that a wide variety of data types may be collected and utilized by the system 1 of the present invention, depending on the types of discrete data that one desires to superimpose over the three-dimensional visualization of metadata. Moreover, while FIG. 6a and FIG. 6b show the network traffic additional information 54 being embedded into the graph data structure prior to the discrete data additional information 55, one skilled in the art will appreciate that the order of embedding the additional data into the graph data structure can vary in alternative embodiments of the present invention.

Referring again to FIG. 2a, the application server 200 functions to retrieve the collected network metadata and discrete data, process the collected data to generate a graph data structure, and then transmit the data to the application client 400. The application server 200 can feature a retrieval engine 210, a graph generator 230, an overlay generator 240, and a client handler 280.

The retrieval engine 210 retrieves network traffic metadata and discrete data from the system database 102 and provides this data to the graph generator 230 and the overlay generator 240. The retrieval engine 210 is configured via the data types information schema 221, which allows the server 200 to be configured and re-configured as different data collectors 101 are added to the system 1 without having to re-compile the server application. The data types information schema 221 enables the retrieval engine 210 to collect different document formats from the system database 102 by specifying document formats by type (e.g., network traffic documents, alert documents, etc.), and the schema 221 also enables the retrieval engine 210 to parse the unstructured data retrieved from the system database 102 using standard JSON encoding and decoding processes. Meanwhile, the data types information schema 221 enables the graph generator 230 to organize the network traffic metadata and discrete data into a graph data structure by defining the normalized fields 40 for each data type (see FIG. 2b) and by defining the groups (i.e., the group ID 51 and the group name 52) for the overlay information map 50.

The graph generator 230 receives the unstructured data and the data types information schema 221 from the retrieval engine 210, and then constructs a graph data structure. (See FIG. 6a). The graph data structure, which consists of a collection of hosts (i.e., vertices) and connections (i.e., edges), is used to organize and store data for each snapshot 30. The data types information schema 221 specifies where the data received from the retrieval engine 210 belongs in the graph data structure. This is achieved by defining the data type name (i.e., connection or host) used to create the vertices and edges in the graph data structure. The graph configuration settings 231 also can be used to specify which data type is used as the base data layer by the graph generator 230, as well as define the max buffer size for system memory and the minimum sleep time used by the server 1 when transmitting the snapshot to the client 400.

The overlay generator 240 adds discrete data to the graph structure generated by the graph generator 230. Each element of the discrete data additional information 55 describes a specific node or edge (each being a graph entity element) in the graph. The overlay generator 240 overlays the specific graph entity element (i.e., node or edge) with the discrete data additional information 55.

Figure 7:
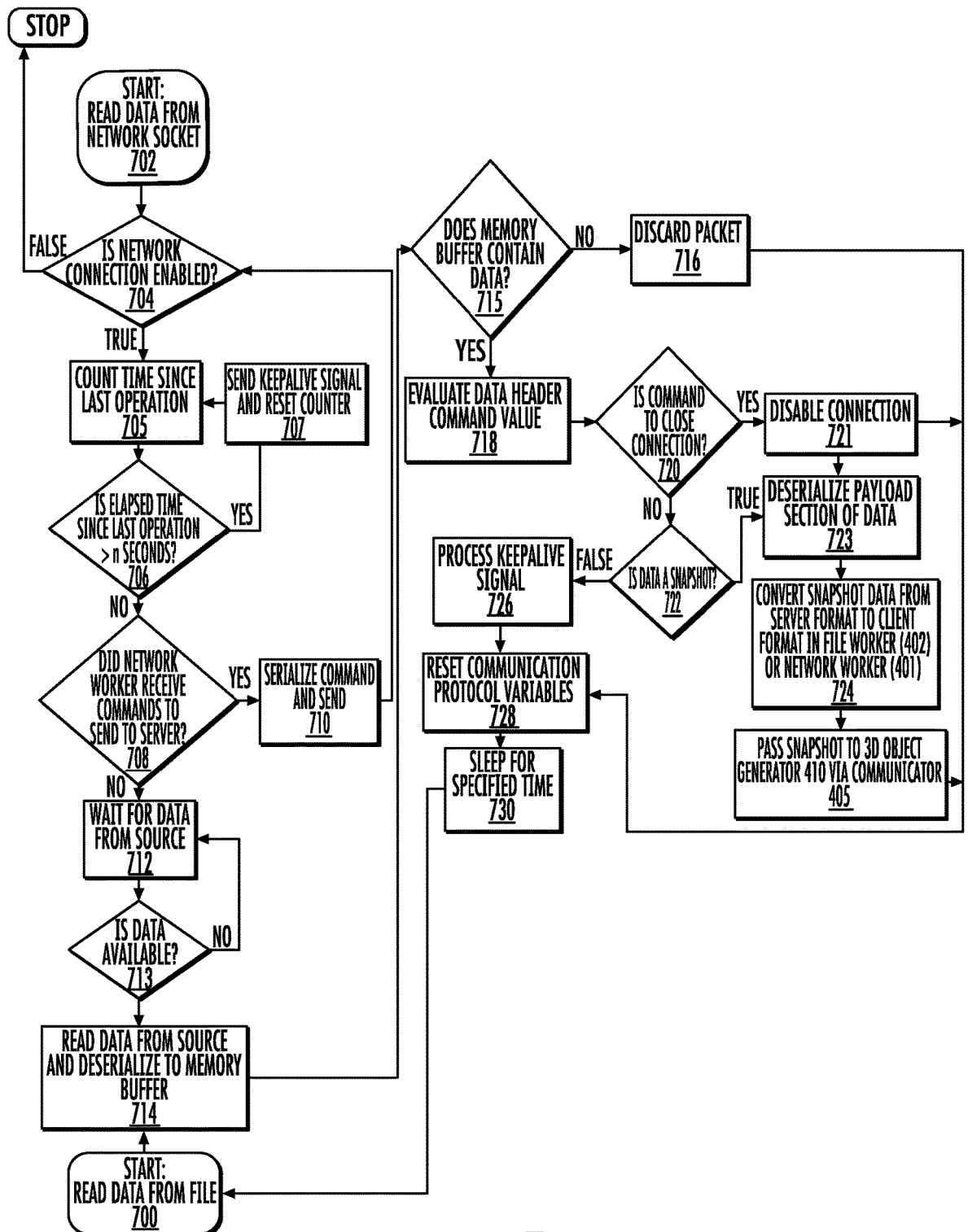
FIG. 7 is a flow diagram depicting an exemplary network communication protocol suitable for use by an embodiment of the system of the present invention.

A client handler 280 can be utilized to communicate with the client 400 over the network 300. The client handler 280 dispatches commands received from the client 400 to the retrieval engine 210, and the client handler 280 delivers the constructed graph data structure to the client 400 in response to a snapshot request. An embodiment of a network protocol used by the client handler 280 for communication between the server 200 and client 400 is illustrated in FIG. 7.

The client application 400 preferably is executed on a computing device capable of data processing operations and generating a 3-D visual display, such as a personal computer or workstation. The client 400 can comprise a network worker 401, a file worker 402, a communicator 405, a 3D objector generator 410, a filter 420, a three-dimensional layout module 430, a movement module 440, and a graphical user interface module 450.

The network worker 401 establishes a connection to the server 200, sending commands to and receiving data from the server's client handler 280. The network worker 401 receives the graph data structure from the client handler 280, de-serializes the data contained within the snapshot, and then dispatches events to the communicator 405. Access to the network worker 401 preferably is isolated and transparent. The file worker 402 is adapted to read data from recorded files 281 (e.g., recorded simulations). Access to the file worker 402 preferably is isolated and transparent.

The communicator 405 receives data from the network worker 401 and file worker 402. In addition to managing both incoming data and outgoing data, the communicator 405 provides high level abstraction (i.e., the communicator hides the source of data from the other client-side modules) to the data received from the network worker 401 or file worker 402. The communicator 405 also is responsible for spawning actors (i.e., nodes and connections) in the 3-D environment. The communicator 405 preferably features a data settings interface 221 configurable by a user of the system 1 to reduce the incoming data set to particular metadata types, thereby allowing the analyst to focus on a particular type or attribute of network data flow.

The 3-D object generator 410 and the three-dimensional layout module 430 collectively function to create a three-dimensional environment. Commercially available software, such as Unreal Engine® (Epic Games, Inc.), can be utilized as the 3-D object generator 410 and layout module 430. In a preferred embodiment, the 3-D object generator 410 creates a three-dimensional environment where each type of network traffic data received from the graph generator 230 is assigned a three-dimensional object—such as spheres, cubes, pipes, or other 3-D objects. Attributes of the network traffic data can be distinguished in the 3-D environment by a color, a size, a position, or changing dynamic values of these three-dimensional objects. For example, all hosts on the private network can be represented as purple spherical icons in space, all hosts on the public network can be represented as green spherical icons in space, all hosts on the external network can be represented as yellow spherical icons in space, and the traffic between each computer host can be represented as colored lines or pipes within space. The 3-D object generator 410 may also assign a certain color, shape, size, position, or a changing dynamic value (e.g., flash, pulse, spin, etc.), which can be adjusted by the analyst through the user interface 450) to each type of overlay metadata received from the data overlay generator 240. For example, a particular network host having a network security alert (i.e., alert data types metadata) associated with it can be represented within the 3-D environment as a red, pulsing sphere, while the unaffected network hosts will remain being represented as blue spherical icons. This allows a human analyst to visually inspect the environment surrounding the computer host(s) associated with the security alert. The analyst can then quickly backtrack any intrusion and block out the attacker by modifying firewall rules or taking other remedial action.

The layout module 430 provides a means for displaying the hosts or "nodes" in virtual space according to a specified strategy. For example, FIG. 1a is an illustration of an exemplary "sandwich" or "layered" 3-D mixed reality environment generated by the layout module 430, while FIGS. 1b-1f illustrate an exemplary "onion" 3-D mixed reality environment generated by the layout module 430.

The movement module 440 controls the end user's movement within the 3-D environment. In one embodiment, the movement module 440 is configured for receiving user input from 3-D peripheral devices such as virtual reality head-mounted displays (e.g., Oculus Rift®—Oculus VR, LLC). In alternative embodiments, the movement module 440 is configured for receiving user input from a standard keyboard and mouse or a gamepad. Commercially available software, such as Unreal Engine® (Epic Games, Inc.), can be utilized to create the layout module 430 and the movement module 440.

The client 400 can further comprise a graphical user interface 450, which allows the analyst to interact with the data visualized in the 3-D environment through the layout and movement modules 430, 440, as well as access and customize the appearance settings 411 and the filter settings 421. The appearance settings 411 allows a user/analyst to configure the 3-D object generator 410 to specify the desired representation of data types and attributes within the 3-D environment. For example, in an embodiment the appearance settings 411 can be configured to allow a user/analyst to change: the color assigned to the network topology; the host and the connection color opacity (e.g., when in grey scale); the color assigned to a specific communication protocol (HTTP, FTP, DNS, etc.); the maximum and minimum of host bloom effect intensity (as dictated by the amount of data transmitted), and other visual personalizations.

The filter settings 421 allows a user/analyst to configure the user interface filter 420 to modify the visualization created by the 3-D object generator 410 by refining and decluttering the three-dimensional environment. For example, when an analyst identifies a particular security threat in the environment which calls for further analysis, the analyst could adjust the filter settings 421 to focus on the particular host(s) associated with the alert over a particular time period (e.g., N+/−5 min). This adjustment of the filter settings 421 will automatically adjust the appearance settings 411 of the 3-D object generator 410, causing the unelected nodes to change size, shape, or color so as to imperceptible (e.g., invisible or greyscale) to the analyst. Because adjustments to the user interface filter 420 dynamically adjusts the appearance settings 411, the analyst has control over the display of network and overlay data in the 3-D environment.

Figure 2E:
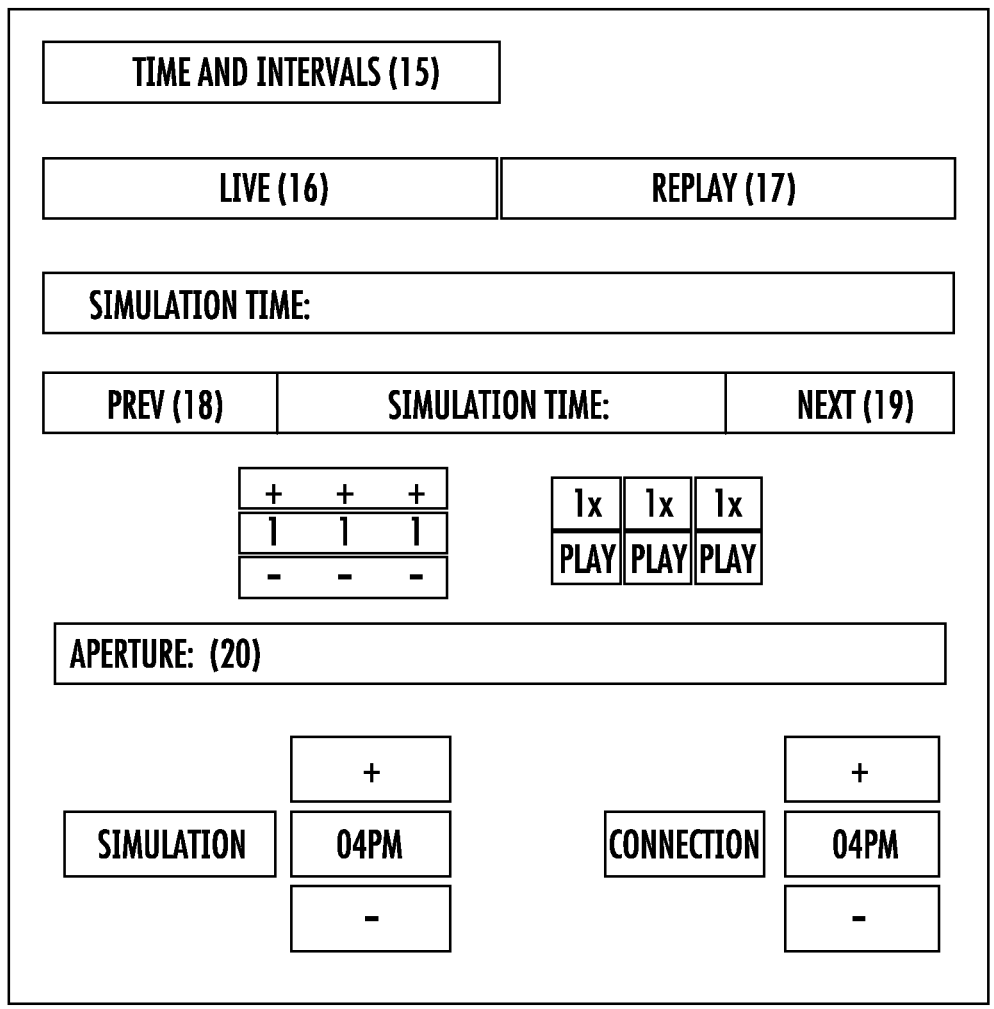
FIG. 2e depicts an exemplary embodiment of a graphical user interface screen that allows for the adjustment of the filter settings and/or the appearance settings of the system.
Figure 2F:
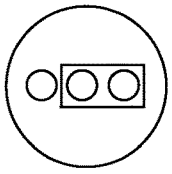
FIG. 2f depicts another exemplary embodiment of a graphical user interface screen that allows for the adjustment of the filter settings and/or the appearance settings of the system.
Figure 2G:
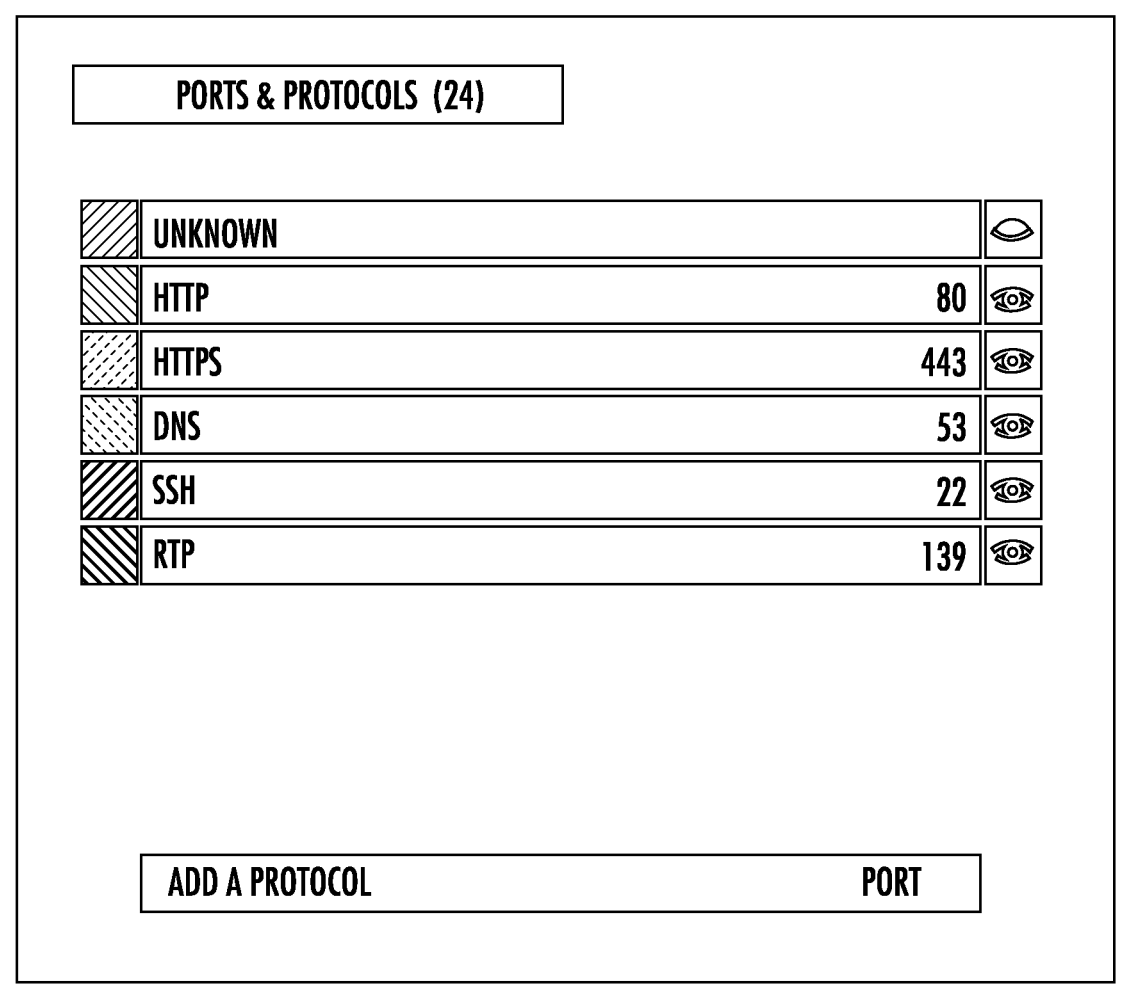
Figure 2H:
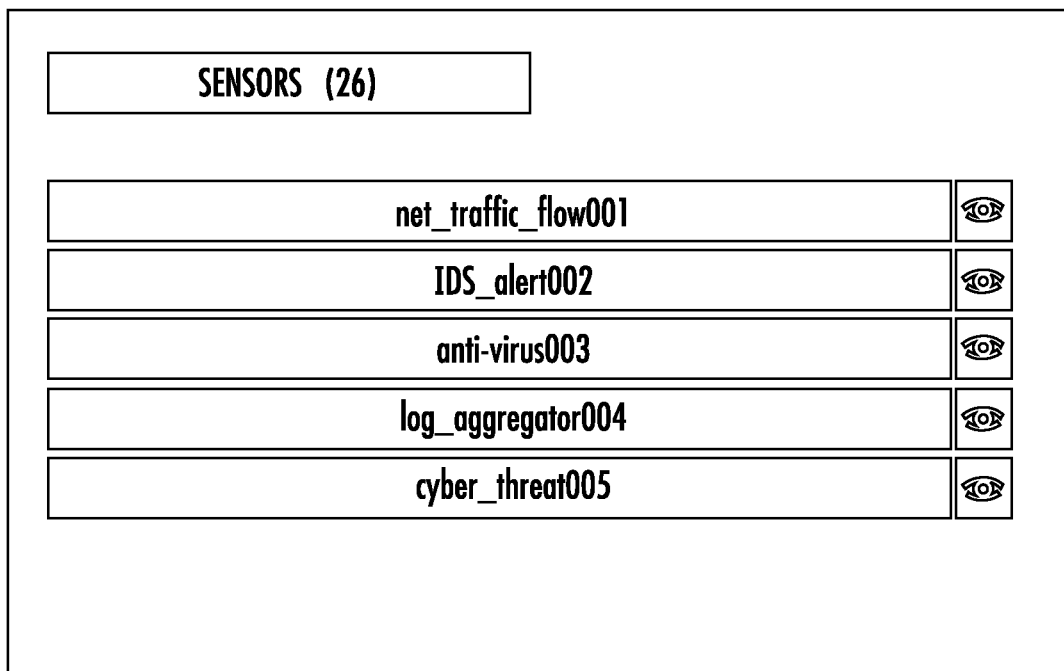
FIG. 2h depicts yet another exemplary embodiment of a graphical user interface screen that allows for the adjustment of the filter settings and/or the appearance settings of the system.

An exemplary graphical user interface 450 may provide the analyst with a plurality of screens to allow for the adjustment of the filter settings 221 and the appearance settings 222. Referring to FIG. 2e, a sample embodiment of a time and intervals interface screen 15 is shown, which allows the analyst to adjust the system's configuration settings relating to the mode of the system (e.g., the real time mode button 16 or playback mode button 17), cycle between the previous and next snapshots (e.g., the previous snapshot button 18 or the next snapshot button 19), or set the snapshot aperture (e.g., the snapshot aperture input box 20). Referring to FIG. 2f, a sample embodiment of a configuration interface screen 22 is shown, which allows an analyst to adjust the appearance settings 222 (connection colors, topological properties, etc.). Referring to FIG. 2g, a sample embodiment of a ports and protocols interface screen 24 is shown, which allows an analyst to select and deselect the visualization of certain port types and protocol types in the 3-D environment. Lastly, referring to FIG. 2h, a sample embodiment of a sensors interface screen 26 is shown, which allows an analyst to select and deselect the visualization of data collected by certain sensors in the 3-D environment. For example, if an analyst desired for the system to only visualize the network traffic overlaid with IDS alerts, the endpoint sensors, log aggregator sensors, and cyber-intelligence sensors could be deselected. In a preferred embodiment of the system 1, the user interface 450 is selectively superimposed over the populated 3-D environment to allow an analyst to quickly access the filter settings 221 and the appearance settings 222.

Figure 3:
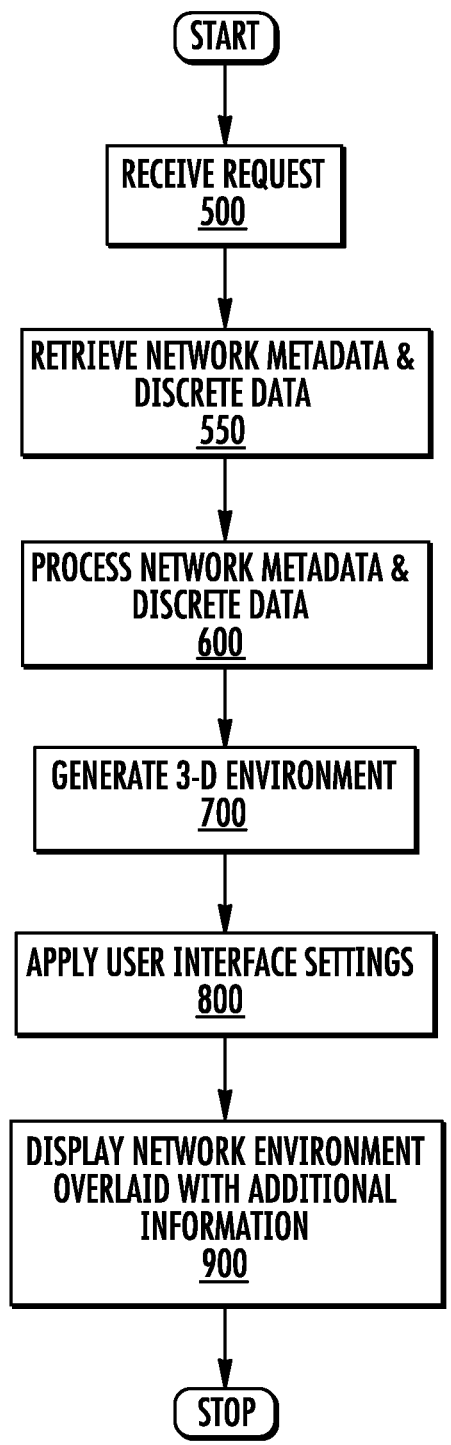
FIG. 3 is a flow diagram depicting an exemplary process carried out by the system of the present invention for providing a three-dimensional visualization of network traffic overlaid with security alerts and other relevant discrete data.

FIG. 3 is a flow diagram depicting an exemplary process carried out by the system 1 to provide three-dimensional visualization of network traffic overlaid with discrete data pertaining to one or more computer hosts or connections in the network, thereby allowing a human analyst to quickly inspect and understand the monitored computer network. The system 1 is particularly useful for the analysis and investigation of security alerts, as the system 1 can display exponentially more usable data to human analysts than prior art systems.

Referring to FIG. 3, the system 1 receives a request in step 500. In a preferred embodiment utilizing a server-client solution, a user/analyst initiates the request through a client 400, which is then communicated to the server 200 over the network 300. Upon receiving the request, the system 1 will retrieve collected network traffic metadata and discrete data (e.g., security alerts) from the system database 102 (step 550). In step 600, the system 1 will process the data by building a graph data structure using the network traffic metadata, and then embedding within the graph data structure one or more layers of network traffic additional information 54 and, if available, one or more layers of discrete data additional information 55.

Next, the system 1 will generate and populate a three-dimensional environment to allow the user to visualize the network traffic and overlaid additional information (step 700). The system 1 will spawn nodes (i.e., network hosts) and connections between nodes in the 3-D environment, assigning a three-dimensional object to each. The system 1 will also assign attributes (e.g., a certain color, shape, size, position, or a changing dynamic value) to each type of discrete data overlay information. Optionally, in step 800, the three-dimensional environment can be further refined and decluttered by applying user interface filter(s) set by the user/analyst. For example, the system 1 can be adjusted to focus on the particular host(s) associated with an alert over a particular time period. Lastly, the system 1 will display the network traffic and overlay information in the three-dimensional environment (step 900).

Figure 4:
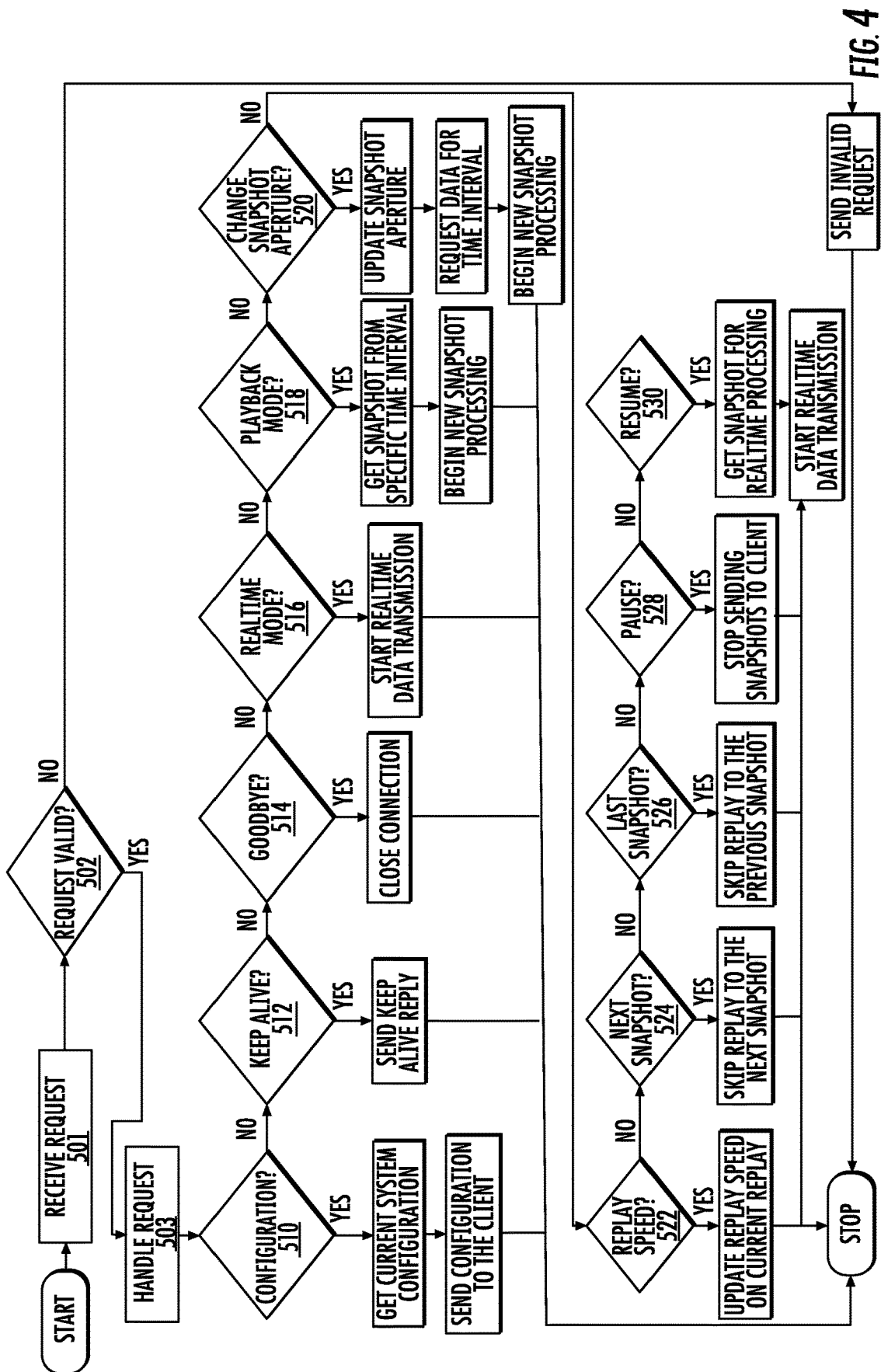
FIG. 4 is a flow diagram depicting an exemplary process carried out by the server of the present invention upon receiving a request from a user.

FIG. 4 shows an exemplary process carried out by the server of the present invention upon receiving a request from a user. In step 501, the application server 200 receives a request from the user via the client 400. The server 200 first validates whether the client is approved to solicit data from the server; e.g., whether the client 400 has the proper software, API, login/password codes, etc. (step 502). If the client request is validated, the server 200 will process the request by analyzing the command value in the packet header (step 503). If the client request is invalid, the server 200 will send an invalid request notification (step 504) to the client 400.

The system 1 can be configured to handle a variety of request types, including a configuration request 510, a keep alive request 512, a goodbye request 514, a real time mode request 516, a replay or playback request 518, a snapshot aperture change request 520, a replay speed change request 522, a next snapshot request 524, a previous snapshot request 526, a pause request 528, and a resume request 530. In a preferred embodiment, each request inputted by the user/analyst is transmitted by the client's communicator 405 to the server's client handler 280, which in turn instructs the retrieval engine 210 to retrieve the collected and process the metadata. The client handler 280 will then transmit the data to the client 400 for generation and population of the three-dimensional environment.

If the request is a configuration request (step 510), the server 200 will access the global client configurations, the client-specific configurations, and the server protocol version being utilized by the server 200. The server 200 will transmit the configuration settings to the client, and then await a new client request from the client.

If the request is a request to keep the sever-client connection open (step 512), the server will keep the connection alive, send a confirmation to the client 400, and then await a new client request from the client. If the request is a request to close the sever-client connection (step 514), the server will close the connection and then await a new client request from the client.

If the request is a request to stream data via real time mode (step 516), the server 200 will retrieve and process the network metadata and discrete data (which is being continuously collected by the data collector(s) 101) on a real-time basis, thereby allowing for the real-time display of the network metadata and discrete data in the three-dimensional environment by the client 400.

If the request is to stream a data replay (step 518), the server 200 will retrieve and process the network metadata and discrete data for a particular time interval specified by the user/analyst. The client 400 will then stop displaying the previous replay or previous snapshot aperture, and start displaying the network metadata and discrete data for the specified time interval in the three-dimensional environment.

The snapshot aperture feature of the system 1 allows the user/analyst to set a time window (i.e., the snapshot aperture) which defines the start time and end time of computer network activity to be visualized by the system 1. If the request is to update the snapshot aperture, the server 200 will update the start time and end time for the current replay (step 520). Next, the server 200 will retrieve and process the network metadata and discrete data within the new snapshot aperture. The client 400 will then stop displaying the previous replay, and start displaying the updated replay with the newly updated snapshot aperture.

The system 1 can be configured to handle a variety of requests relating to the display of the network metadata and discrete data in the three-dimensional environment. If the request is to adjust the replay speed (step 522), the server 200 will send snapshots to the client at the newly defined frequency (the speed of the replay), and then await a new client request from the client. If the request is a Next Snapshot request (step 524), the server 200 will skip to the next snapshot, and then await a new client request from the client. If the request is a Last Snapshot request (step 526), the server 200 will replay the previous snapshot, and then await a new client request from the client. If the request is a request to pause (step 528), the server 200 will close the current streaming of the network metadata and discrete data in the three-dimensional environment, and then await a new client request from the client. Lastly, if the request is to resume (step 530), the server 200 will retrieve and process the network metadata and discrete data for the next snapshot, based upon the existing settings. The client 400 will then stop displaying the previous replay or previous snapshot, and start displaying the network metadata and discrete data of the requested snapshot in the three-dimensional environment.

Figure 5:
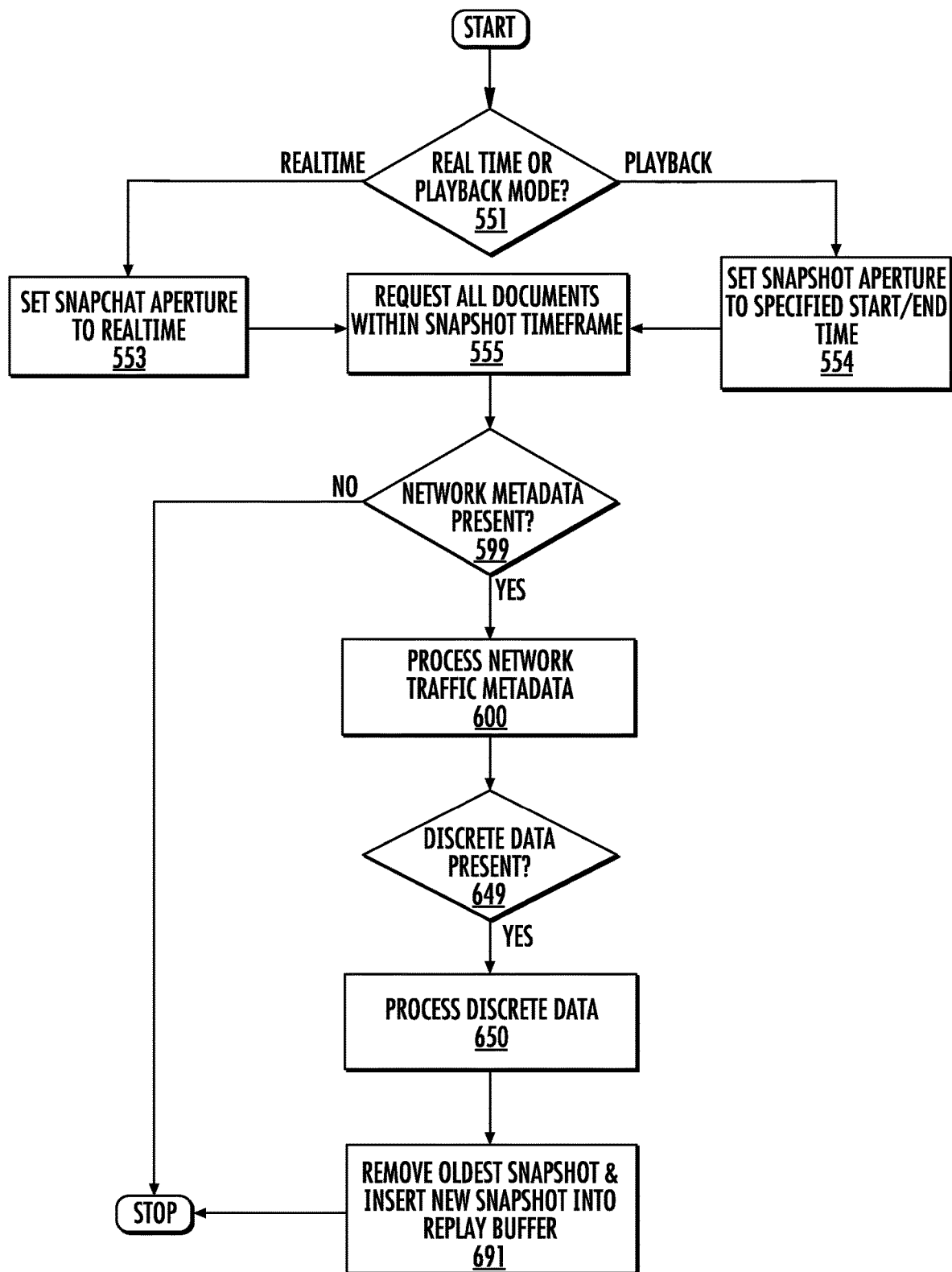
FIG. 5 is a flow diagram depicting an exemplary process for retrieving network traffic metadata and discrete data and processing the same.

FIG. 5 shows an exemplary process carried out by the server of the present invention for retrieving network metadata and discrete data and processing the same. Upon receiving a request from the client 400 for a snapshot, the server 200 will first inquire whether the system 1 has been set to real time mode (see FIG. 4, step 516) or replay mode (see FIG. 4, step 518).

If the system 1 is set to replay mode, the server 200 in step 554 will set the snapshot aperture—the time interval defined by the start date time 35 and the snapshot end date time 36 as specified by the user/analyst. In step 555, the server's retrieval engine 210 will then communicate with the network database 102 and request network traffic metadata and discrete data associated with the specified search time interval. If network traffic metadata is determined to exist within the specified search time interval (step 599), the graph generator 230 will process the retrieved network traffic metadata by constructing a graph data structure and overlaying the network traffic additional information 54 as shown in greater detail in FIG. 6a (step 600). Next, if discrete data is determined to exist within the specified search time interval (step 649), the overlay generator 240 will process the retrieved discrete data by overlaying the discrete data additional information 55 over the graph vertices and edges as shown in greater detail in FIG. 6b (step 650). Lastly, the server 200 will remove the oldest snapshot from the replay buffer, and then insert the new snapshot in the replay buffer for transmission to the client 400 (step 691).

If the system 1 of the present invention is set to real-time mode, the server 200 will retrieve and process the network and overlay metadata from the network database 102 on a real-time basis, thereby allowing for the real-time display of the network and overlay data in the three-dimensional environment by the client workstation 400. In step 553, the server 200 will set the snapshot aperture for real-time display of the network environment by starting the real-time mode timer and retrieving the sleep time parameter from the graph configuration file 231. Using this data, the server 200 is capable of setting the snapshot aperture for real-time capture of the network traffic metadata and discrete data. Next, the server 200 queries the system database 102 for all documents within the real-time snapshot aperture, and then the server 200 retrieves and processes the network traffic metadata and discrete data as described above with respect to steps 555 through 691.

In a preferred embodiment, the system 1 may also employ a process for ensuring that the real-time timer remains properly synchronized in order to capture subsequent real-time snapshots. In order to keep the real-time timer properly synchronized, the server 200 will evaluate how much time passed while the previous snapshot was being generated, and then the server 200 will determine if more time passed than the sleep time value provided by the graph configuration file 231. If the sleep timer was exceeded, the server 200 changes the start time on the next snapshot in order to prevent a gap in the retrieval of data. If the timer has not exceeded the sleep time, then the server 200 will wait until the timer reaches the sleep time value before starting to retrieve and process the next snapshot for real-time display by the client 400.

FIG. 6a shows an exemplary process carried out by the server of the present invention for constructing a graph data structure using the collected network traffic metadata and then embedding one or more layers of network traffic additional information 54 into the graph data structure. While an exemplary process for constructing the graph data structure is shown in FIG. 6a and described herein, one skilled in the art will readily recognize that alternative processes can be utilized to represent the collected metadata in a graph structure.

The retrieval engine 210 retrieves unstructured data from the system database 102 upon receiving a request from a client 400, loads the data types information schema 221 files into system memory, and parses the data using standard JSON encoding/decoding functions by evaluating the data using the data types information schema 221. The graph generator 230 receives this parsed data and the data types information schema 221 from the retrieval engine 210 and produces an intermediary data array. The graph generator 230 then processes the data using the data types information schema 221 for a given document type to create a graph data structure used to organize the network traffic metadata. The graph data structure is populated by vertices (which represent computer hosts) and edges (which represent connections) to visualize the network environment. The particular metadata types used to create the vertices and edges in the graph structure are shown in FIG. 2b. The additional information overlay generator 240 cooperates with the graph generator 230 to include with one or more layers of network traffic additional information 54 about the computer hosts and connections represented in the graph data structure. And as further described with respect to FIG. 6b, discrete data additional information 55 can also be embedded into the graph data structure, thereby allowing an analyst to visualize alerts and other information superimposed over the 3-D network environment.

Referring now to FIG. 6a, the server's graph generator 230 will first inquire if the dataset received from the retrieval engine is empty (step 601). If data is available, the graph generator 230 will extract the normalized fields 40 data according to the data type information schema 221 and insert the data into an intermediary data array (step 602). Next, for each non-normalized data field read by the graph generator 230 (e.g., network metadata details such as number of packets sent, bytes transmitted, etc.), the graph generator 230 will assign the appropriate group ID 51 and group name 52 to the data according to the data type information schema 221, and then it will insert the data into the overlay information map 50—a nested array (step 604). The intermediary array and nested sub-arrays are built in an iterative fashion for each document that is processed (steps 602-604), with the aggregated data available in the intermediary array (which includes the nested sub-arrays) being used to generate the graph data structure.

The intermediate data array generated in steps 602 through 604 can include edge data, vertex data, or edge and vertex data. In a preferred embodiment, the data type information schema 221 can be configured to identify the intermediate data array with a layer type value, namely: Type 1 for arrays consisting of edge data only; Type 2 for arrays consisting of vertex data only; and Type 3 for arrays consisting of both edge and vertex data.

In step 605, the graph generator 230 will evaluate the intermediary array generated in steps 602 through 604 and evaluates the data layer type. If the intermediary array is identified as a Type 1 or Type 3 data layer type, the graph generator 230 will search for an existing edge on the graph data structure using the normalized field data 40 organized within the intermediary array (step 607). If an existing edge is found, the graph generator 230 in step 611 will extract from the intermediary array the network traffic additional information 54 that is associated with the connection, and then the graph generator 230 will add the network traffic additional information 54 to the graph edge. If an existing edge is not found, the graph generator 230 will first add a new edge to the graph (step 608) and then add the network traffic additional information 54 to the graph edge (step 611).

Next, the graph generator 230 will determine if any new vertices need to be added to the graph structure by using the normalized field data 40 to search for an existing vertex associated with the edge in the graph (step 613). If an existing vertices is found, the graph structure will be updated (step 619). If no existing vertices are found, in step 615 new vertices will be added to the graph data structure (representing both computer hosts involved in the connection), associated metadata from the normalized fields 40 will be added to the vertices within the graph data structure (step 617), and then the graph structure will be updated (step 619).

Once the graph structure is updated, the graph generator 230 will search for existing vertices within the graph data structure based upon the normalized fields data 40 (step 621). If no existing vertices are found, the graph generator 230 will initialize array values to remove the present document from the document list (step 625), and then will again inquire whether the document list is empty (step 601). However, if existing vertices are found, the graph generator 230 will extract the network traffic additional information 54 that is associated with each computer host, add the network traffic additional information 54 to the graph vertices (step 623), remove the present document from the document list (step 625), and then will again inquire whether the document list is empty (step 601).

If the data array is identified as a Type 2 data layer type, the graph generator 230 will bypass steps 607 through 619 since a data array having vertex-only information does not provide a basis for creating a new edge (i.e., a connection). When processing a Type 2 data layer type, the graph generator 230 will cycle through steps 621-625 to determine if network traffic additional information 54 to the graph vertices should be added to one or more existing vertices. Once completed, the graph generator 230 will remove the present document from the document list (step 625), and then will again inquire whether the document list is empty (step 601).

FIG. 6b shows an exemplary process carried out by the server of the present invention for overlaying the graph data structure with discrete data additional information 55 derived from the discrete data. Referring to FIG. 6b, the server's overlay generator 240 will first inquire if the dataset received from the retrieval engine is empty (step 651). If data is available, the overlay generator 240 will extract the normalized fields 40 data according to the data type information schema 221 and insert the data into an intermediary array (i.e., the overlay information map 50) (step 652). The normalized fields in the intermediary array are utilized by the overlay generator 240 to associate the discrete data additional information 55 with the appropriate edge or vertex in the graph data structure. Next, for each non-normalized data field read by the overlay generator 240, the overlay generator 240 will assign the appropriate group ID 51 and group name 52 to the data according to the data type information schema 221, and then it will insert the data into the overlay information map 50 as a nested array (step 654). The overlay information map 50's intermediary array and nested sub-arrays are built in an iterative fashion for each document that is processed (steps 652-654), with the aggregated data available in the intermediary array (which includes the nested sub-arrays) being used by the overlay generator 240 to populate the graph data structure with discrete data relevant to the computer hosts and connections active within the monitored network.

Like the graph generator 230, the intermediary data arrays generated by the overlay generator 240 in steps 652 through 654 are identified with a layer type value, specified in the data type information schema 221. In a preferred embodiment, the schema 221 defines three possible types of data layer arrays: Type 1 (edge data only); Type 2 (vertex data only); and Type 3 (both edge and vertex data).

In step 655, the overlay generator 240 evaluates the intermediary data array generated in steps 652 through 654 and evaluates the data layer type. If the data array is identified as a Type 1 or Type 3 data layer type, the overlay generator 240 will search for an existing edge on the graph based upon the normalized fields (step 657). If an existing edge is not found, the overlay generator 240 will remove the present document from the document list (step 665), and then will again inquire whether the document list is empty (step 651). However, if an existing edge is found, the overlay generator 240 in step 659 will extract the discrete data additional information 55 that is associated with the connection from the intermediary array, and then the overlay generator 240 will add the discrete data additional information 55 to the graph edge (step 659).

Once the discrete data additional information 55 is added to the graph edge in step 659, the overlay generator 240 in step 661 will next search for existing vertices on the graph based upon the normalized fields (step 688). If an existing vertex is not found, the overlay generator 240 will remove the present document from the document list (step 665), and then will again inquire whether the document list is empty (step 651). However, if an existing vertex is found, the overlay generator 240 in step 663 will extract the overlay additional information from overlay information map 50 that is associated with the computer host(s), and then the overlay generator 240 will add the discrete data additional information 55 to the each vertex. The overlay generator 240 will then remove the present document from the document list (step 665), and then will again inquire whether the document list is empty (step 651).

If the data array is identified as a Type 2 data layer type, the overlay generator 230 will bypass steps 657 through 659 since a data array having vertex-only information does not provide a basis for adding any overlay data to an existing edge (i.e., a connection). When processing a Type 2 data layer type, the overlay generator 240 will cycle through steps 661-665 to determine if any discrete data additional information 55 should be added to an existing vertex. Once completed, the overlay generator 240 will remove the present document from the document list (step 665), and then will again inquire whether the document list is empty (step 651).

FIG. 7 shows an exemplary network communication protocol that can be utilized by the system 1 when a server-client solution is employed. The network communication protocol is preferably configured to allow large amounts of data to be transmitted between the server 200 and the client workstation 400. While an exemplary network communication protocol is shown in FIG. 7 and described herein, one skilled in the art will readily recognize that alternative communication protocols can be utilized to transmit data between the server 200 and client workstation 400.

Referring now to FIG. 7, the network communication protocol 700 can be utilized to transmit and receive data from a data file or from a network socket. When the data is being transmitted from the server 200 to the client 400 via the network socket (e.g., the transmittal of the graph structure by the client handler 280 to the network worker 401), the network worker 401 first will inquire whether the client connection is enabled (step 704).

If enabled, the network worker 401 in steps 705-708 will initiate a subroutine to determine if the client-server connection is still alive. The network worker 401 features a timer which counts time (in seconds) since its last operation (step 705). In step 706, the network worker 401 will inquire whether the elapsed time since the last operation is greater than N seconds to verify that the connection is alive (step 705). In a preferred embodiment, N is set to three seconds, while the server 200 is configured to terminate the client-server connection after five seconds if the server has no outstanding operations for the particular client 400. If the elapsed time since the client 400's last communication with the server 200 exceeds N seconds (e.g., three seconds), the client 400 in step 707 will send a "keep alive" command to keep the connection towards the server 200 alive, reset the time counter (step 705), and then will again inquire whether the elapsed time since the last operation is greater than N seconds (step 706).

If the elapsed time since the client 400's last communication with the server 200 is less than N seconds (e.g., three seconds), the network worker 401 will inquire whether there are any commands that need to be sent to the server 200 (step 708). If there are commands that need to be sent, the network worker 401 will serialize the command and transmit it to the server 200 (step 710), and then the network worker 401 will again query whether a connection is enabled (step 704). If there are no commands that need to be sent by the client 400 to the server 200, the network worker 401 will wait for data available in the socket (step 712).

If a data packet is available in either a data file or in the network socket, the network worker 401 will retrieve the data packet from the server 200 and deserialize the data packet to the memory buffer (step 714). Next, the network worker 401 will inquire whether data is contained within the memory buffer (step 715). If no data is located in the memory buffer, the network worker 401 will discard the data packet (step 716) and momentarily sleep (step 730). However, if data is located, the network worker 401 will evaluate the data header command value and execute the command (step 718).

In step 720, if the command is to close the connection, the network worker 401 will close the client-server connection (step 721), reset the internal communication variables by deleting the temporary socket array received in step 714 (step 728), and then momentarily sleep (step 730).

In step 722, if the command is to receive a serialized data payload (e.g., a graph data structure representing the network traffic metadata and discrete data for the time interval), the network worker 401 will deserialize the payload by converting the stream of bytes contained in the packet payload into the corresponding object definition (e.g., FNetNetworkStatus) (step 723); convert the snapshot data received from the server into a format readable by the 3-D object generator 410 (step 724); will pass the snapshot to the 3-D object generator 410 via the communicator 405 (step 725); reset the communication protocol variables (step 728); and then momentarily sleep (step 730). In step 722, if the command is not to receive a serialized data payload, the network worker 401 will process the "keep alive" signal (step 726), reset the communication protocol variables (step 728), and then momentarily sleep (step 730).

Figure 8:
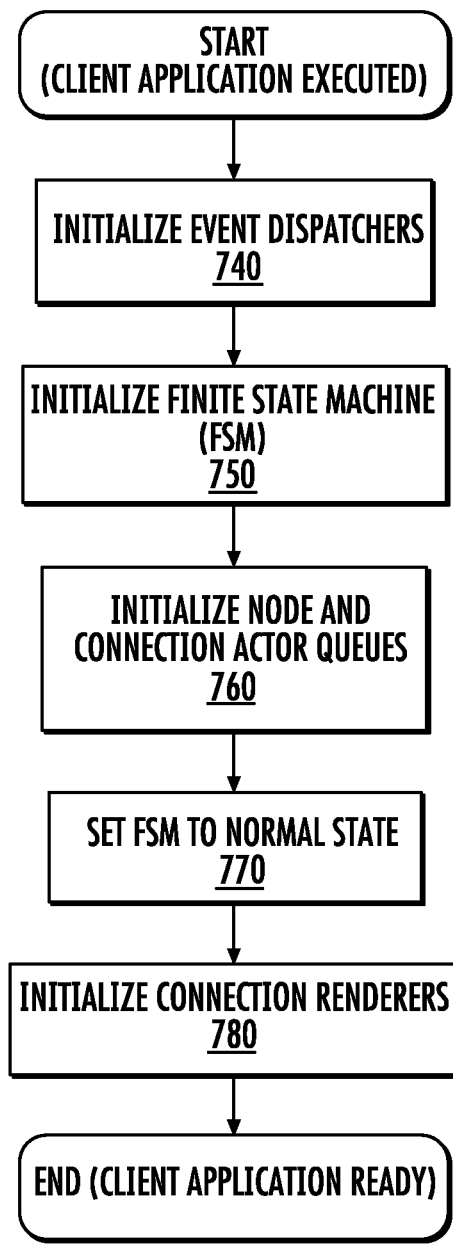
FIG. 8 is a flow diagram depicting an exemplary client initialization process suitable for use by an embodiment of the system of the present invention.

FIG. 8 shows an exemplary process by which the client initializes the runtime components that receive, process, and visualize data via the network worker 401, the file worker 402, the communicator 405, the 3-D object generator 410, three-dimensional mixed reality layout module 430, and the user interface 450.

Figure 12:
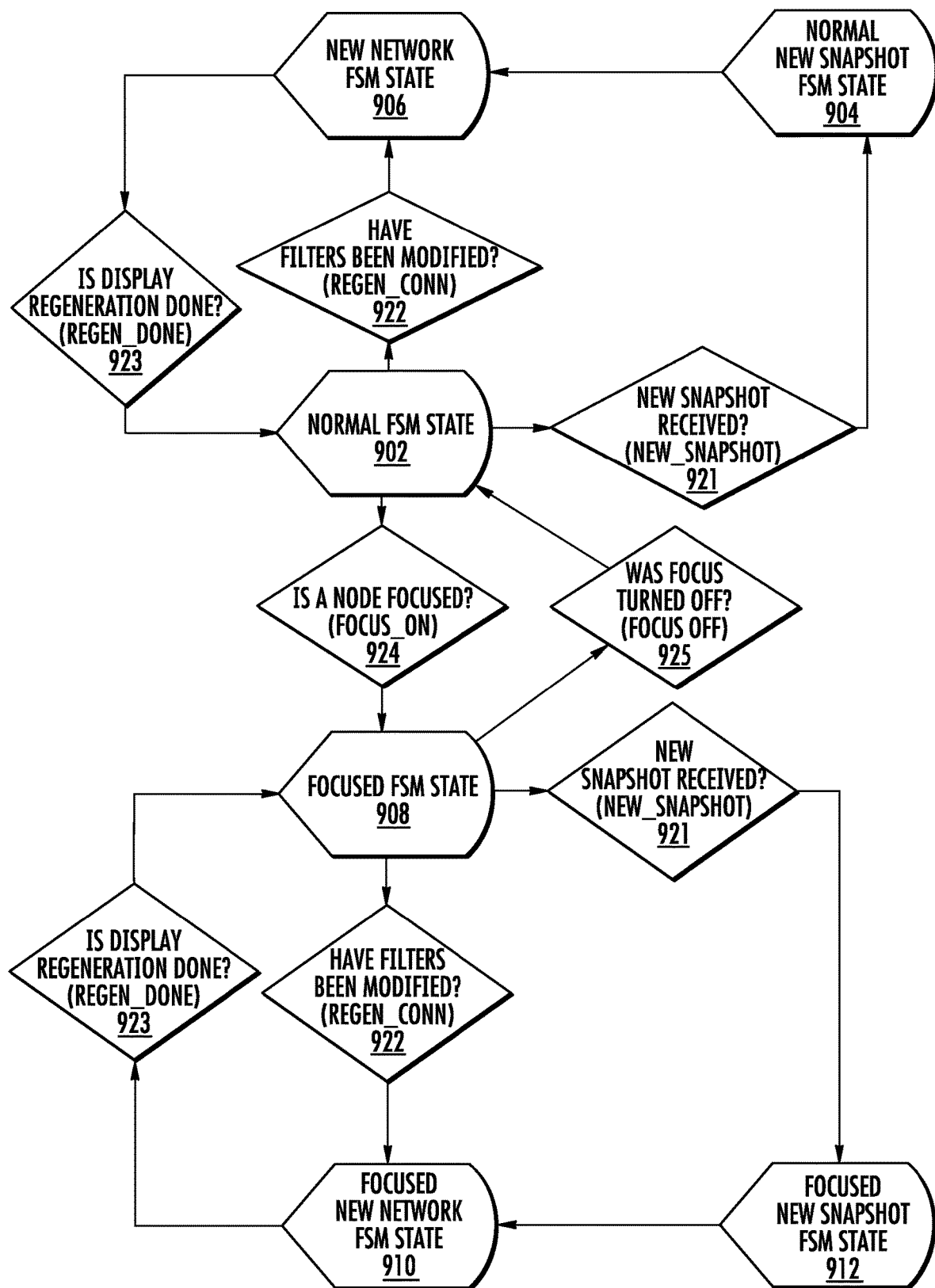
FIG. 12 is a diagram depicting the finite state machine of the generated 3-D environment and the transitions used by the system into and out of these states.

Referring now to FIG. 8, in step 740 the client 400 will initialize event dispatchers responsible for communication between the data handler modules, and the visualization modules that present the environment to the user. The event dispatchers are necessary for communication between the data handling modules (i.e., the network worker 401 and the file worker 402) and the user interface 450. Next, the client 400 will initialize the finite state machine in order to keep track of the internal state of the communicator 405 (step 750). FIG. 12 depicts an exemplary embodiment of a finite state machine suitable for use with the system 1. The client 400 will then initialize the queues, which will be filled and emptied with actors (vertices/hosts) that are preferably spawned asynchronously in order to avoid exceeding the system 1 client's processing capabilities (step 760). In step 770, the client 400 will set the state of the finite state machine to NORMAL, and then the connection renderers (i.e., the modules responsible for connection rendering) will be initialized (step 780). As with actor queues, instanced rendering is used to decrease the geometry count and to reduce the computational load on hardware (e.g. video graphics cards). Once the initialization process has been completed for client processes, the 3-D visualization of the network environment can be generated and populated using the graph data structure received from the server 200.

Figure 9:
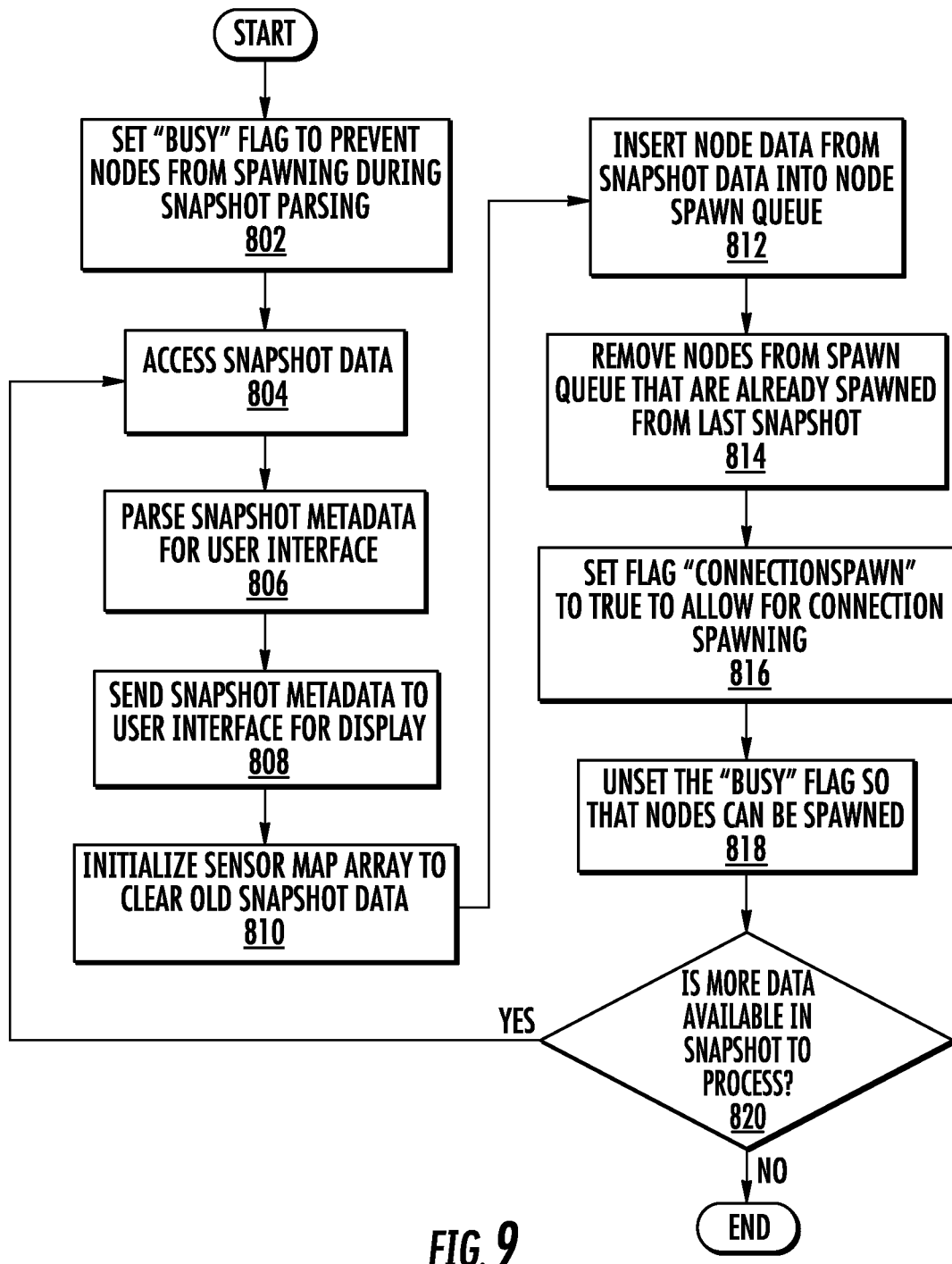
FIG. 9 is a flow diagram depicting a first portion of an exemplary process for generating and population the three-dimensional environment.
Figure 10:
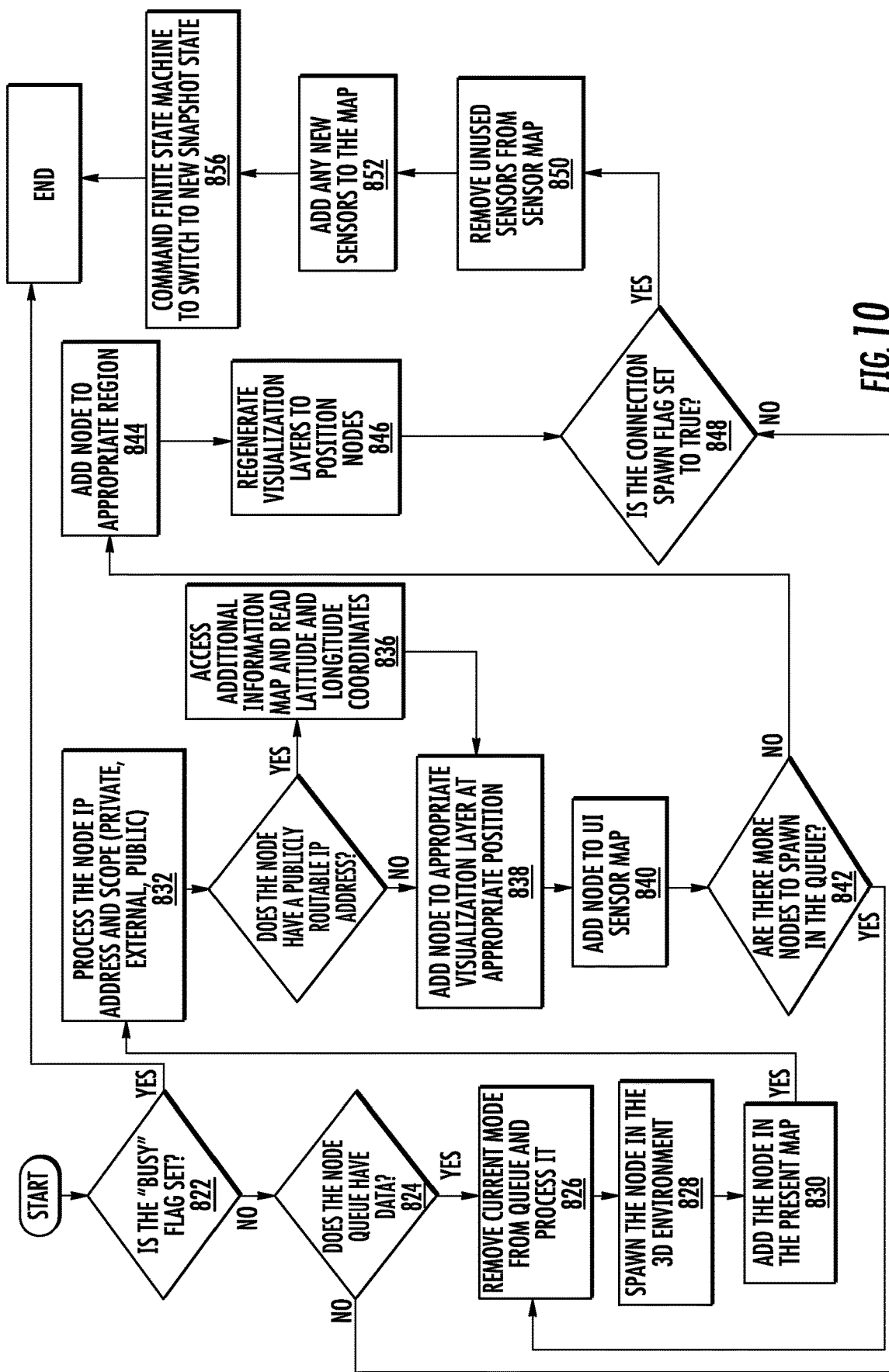
FIG. 10 is a flow diagram depicting a second portion of an exemplary process for generating and population the three-dimensional environment.
Figure 11:
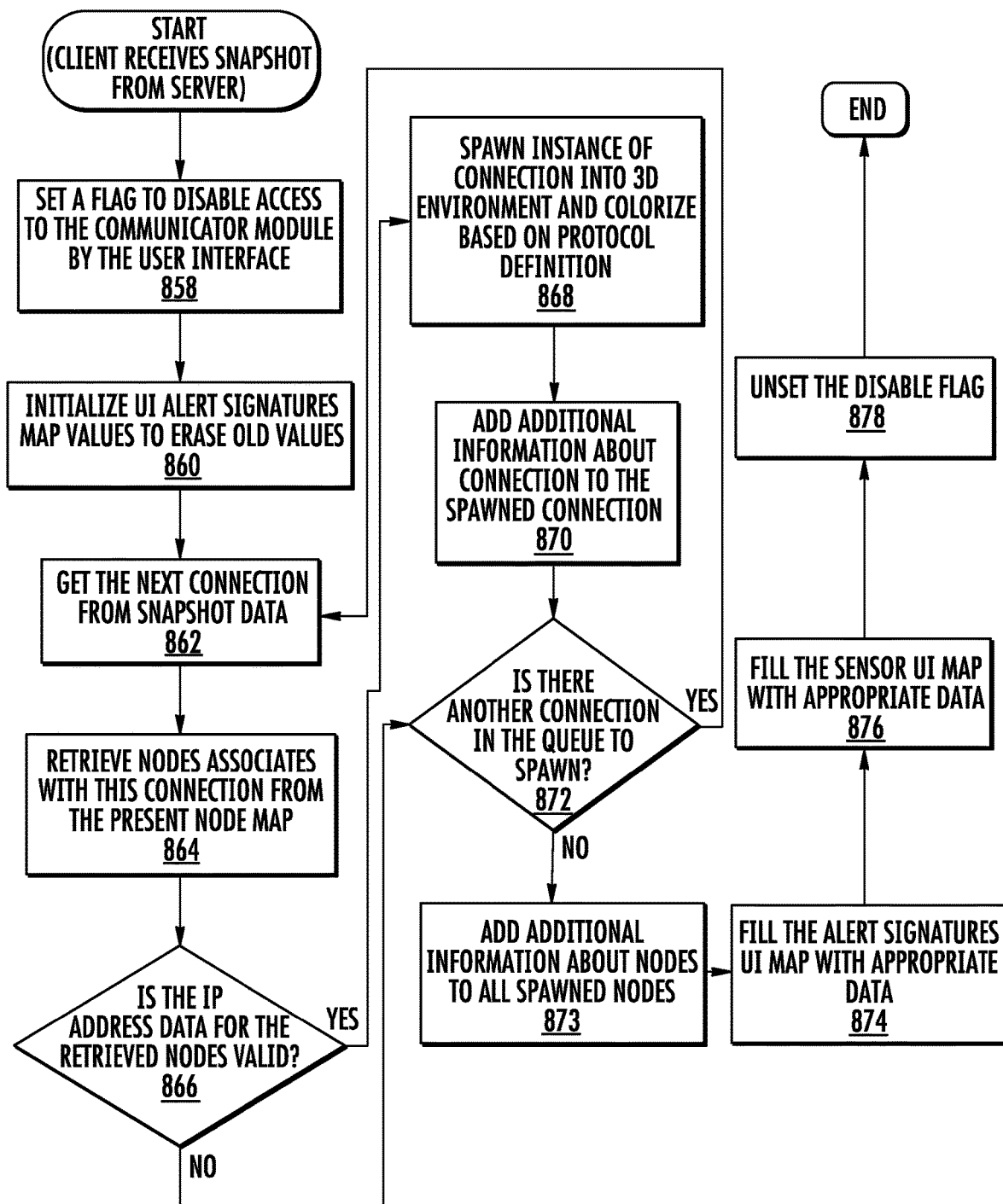
FIG. 11 is a flow diagram depicting a third portion of an exemplary process for generating and population the three-dimensional environment.

FIGS. 9-11 show an exemplary process that can be utilized by the system 1 for generating and populating the three-dimensional environment. FIG. 9 depicts an embodiment of a process for parsing a new snapshot and preparing the 3-D environment for the spawning of new nodes and connections in the simulation. FIG. 10 depicts an embodiment of a process for spawning nodes (i.e., graphical representations of computer hosts) in the simulation. FIG. 11 depicts an embodiment of a process for spawning connections (i.e., graphical representations of network traffic between two computer hosts) in the simulation.

Referring to FIG. 9, the communicator 405 first implements a temporary lock to prevent the communicator 405 from spawning new nodes and connections while the snapshot is being parsed (step 802). Next, the communicator 405 will retrieve the next snapshot (i.e., the graph data structure representing the network traffic metadata and discrete data for a specified time interval) (step 804), parse the snapshot metadata by populating the user interface fields (e.g., start date time 35, end data time 36, sensor name list 33) (step 806), and then dispatch the metadata information (e.g., start, end, number of hosts, live or replay) to the user interface 450 for display to the analyst (step 808). The communicator 405 then will empty the sensor map (i.e., a list of sensors displayed in the user interface 450) from the previous snapshot to ensure the newly generated environment reflects information from the present snapshot only (step 810), enqueue nodes from the snapshot by pushing incoming snapshot data—which has been parsed by the network worker 401 into a format readable by the 3D object generator 410—to the corresponding spawning queue (step 812), and remove unused nodes from the simulation that had been previously spawned by the 3D object generator 410 for the last snapshot (step 814). Next, the communicator 405 will enable the spawning of connections in the simulation (step 816) and remove the temporary lock so that nodes can be spawned (step 818). In step 820, the communicator 405 will query whether there are any additional snapshots in the queue, with steps 804 through 820 being repeated by the communicator 405 until there are no additional snapshots in the queue.

Referring now to FIG. 10, a process for spawning nodes in the simulation is shown. In step 822, the communicator 405 will verify that the client 400 is unlocked to allow the communicator 405 to spawn new nodes in the simulation. If unlocked, the communicator 405 will inquire whether there are any nodes to spawn in the spawning queue (step 824). If the spawning queue is empty, the communicator 405 will proceed to verify that the communicator 405 is unlocked to spawn new connections in the simulation (step 848), will remove unused sensors from the sensor map (step 850), add any new sensors to the map (852), and then issue a command to the finite state machine to switch to the New Snapshot state (step 856).

If the spawning queue is not empty, the communicator 405 will initiate a process of spawning new nodes in the simulation. The communicator 405 first will remove a node from the queue (step 826) and then spawn the node in the 3-D environment (step 828). Next, the communicator 405 will add the node to a present node map—an intermediary data structure populated in an iterative fashion by the communicator 405 until the spawning queue is emptied (step 830). In step 832, the communicator 405 will parse the IP address and network location (i.e., whether the node is within the private network, public network, or external network) for the node. If the node has a publicly routable IP address, the communicator 405 will access the overlay information map 50 to obtain the latitude and longitude coordinates for the node (step 836). The node will then be assigned to the appropriate visualization layer based upon whether the node is located within the private, public, or external network (or any other visualization layer defined by the system 1), and the node will be assigned to the appropriate position defined by the latitude and longitude coordinates for the node contained within the network traffic additional information 54 pursuant to step 836, or at a default position based upon the node's visualization layer if the latitude and longitude coordinates are not available in the network traffic additional information 54. In step 840, the communicator 405 will add the node to the user interface sensor map (i.e., the listing of sensors visible through the user interface 450), and then in step 842 the communicator 405 will inquire whether there are additional nodes present in the spawning queue (step 842). If additional nodes are present, steps 826 through 840 will be repeated in an iterative fashion until the spawning queue is emptied.

Once the spawning queue is emptied, the communicator 405 will assign each node located within the present node map to the appropriate region (step 844), and then the 3-D object generator 410 will regenerate the visualization layers in order to position the nodes within the 3-D simulation (step 846). Next, the communicator 405 will proceed to verify that the communicator 405 is unlocked to spawn new connections in the simulation (step 848), will remove unused sensors from the sensor map (step 850), add any new sensors to the map (852), and then issue a command to the finite state machine to switch to the New Snapshot state (step 856).

Referring now to FIG. 11, an exemplary process is depicted for building connections within the 3D simulation and overlaying the nodes and connections with the network traffic additional information 54 and the discrete data additional information 55 contained within the snapshot. In step 858, the communicator 405 will disable communication between the user interface 450 and the communicator 405 while new connections are spawned pursuant to the process described herein. Next, the communicator 405 will clear the alert signatures map (i.e., the listing of alerts visible through the user interface 450), thereby removing from user interface 450 all alert information from the previous snapshot (step 860).

In step 862, the communicator 405 will get the next connection from the snapshot graph structure. In step 864, the communicator 405 will retrieve the nodes associated with this connection from the present node map. If the source and destination host metadata is determined to be valid based upon the normalized field data (step 866), the communicator 405 will spawn the connection (e.g., a three-dimensional pipe representing traffic between two nodes) and assign the connection a color based on the destination port number associated with the connection (step 868). In step 870, the communicator 405 will overlay the connection with network traffic additional information 54 and, if available, with one or more layers of discrete data additional information 55. Next, the communicator 405 will inquire whether the connection array is empty (step 872), with steps 862 through 870 being repeated until the connection array is emptied. Once emptied, the communicator 405 will overlay the nodes with the network traffic additional information 54 and discrete data additional information 55 (step 873), fill the user interface map with alert signature information (step 874), fill the user interface map with sensor information (step 876), and then re-enable the user interface 450 to communicate with the communicator module 405 (step 878).

FIG. 12 shows the various states of the generated 3-D environment and the transitions used by the system into and out of these states. The communicator 405's finite state machine cooperates with the 3-D generator 410 to handle the process of generating the 3-D environment, with the display of the 3-D environment being dynamically adjusted as new snapshots are received by the client 400 and as filter settings are inputted by an analyst.

Referring to FIG. 12, the Normal state 902 is the starting state of the finite state machine whereby all nodes and connections in the present snapshot are visualized, and the Focused state 908 is an auxiliary state assumed by the system 1 when the user has selected a node on which to focus. Whether in the Normal state 902 or in the Focused state 908, the system 1 is configured to allow for the seamless transition to new snapshots and the regeneration of connections within the three-dimensional environment.

When in the Normal state 902 and a new network snapshot is available, the New_Snapshot transition 921 will communicate the arrival of a new network snapshot, with Normal New Snapshot 904 being an intermediary state of the finite state machine associated with the arrival of the new network snapshot. Regen_Conn transition 922 is a transition of the finite state machine used to communicate the need of regenerating connections, with New_Network 906 being an intermediary state of the finite state machine associated with the regeneration of all connections between hosts displayed in the three-dimensional environment. Regen_Done transition 923 is a transition of the finite state machine used to communicate that the regeneration of the connections is complete, with the system 1 then re-assuming the Normal state 902.

The Focus_On transition 924 is a transition of the finite state machine used to communicate the selection of a host and the transition to the Focused state 908, while the Focus_Off transition 925 is a transition of the finite state machine used to communicate the deselection of a host and the transition back to the Normal state 902. When in the Focused state 908 and a new network snapshot is available, the New_Snapshot transition 921 will communicate the arrival of a new network snapshot, with the Focus New Snapshot state 912 being an intermediary state associated with the arrival of a new network snapshot while maintaining the focused status. Regen_Conn transition 922 is a transition of the finite state machine used to communicate the need of regenerating connections, with the Focus New Network 906 state being an intermediary state of the finite state machine associated with the regeneration of all connections between hosts displayed in the three-dimensional environment while maintaining the focused status. Regen_Done transition 923 is a transition of the finite state machine used to communicate that the regeneration of the connections is complete, with the system 1 then re-assuming the Focused state 908.

Referring now to FIGS. 13 and 14, the system 1 is particularly adept at providing contextual and intuitive visualization of security data in order to prioritize security response activity. Data collector's such as intrusion detection systems (IDS's) can be utilized to obtain data pertaining to a security alert. The system 1 visualizes the network environment, thereby providing the proper context of security events so that the analyst can investigate the security alert and develop an appropriate response for addressing any intrusion(s).

One investigative tool enabled by the system 1 which is particularly useful for investigating security alerts is referred to herein as the path feature. An embodiment of the path feature is shown in FIGS. 13*a*-13*e*. The path feature allows a user to select specific objects (e.g. hosts, connections, user accounts, login events, etc.) within the 3-D environment and add these objects to the path listing. Once added, the objects are highlighted in the environment and represent the path taken by an attacker during the potential cybersecurity data breach (or intrusion). The path list is a listing of computers, user accounts, data, and other assets within the computer network environment that the attacker leveraged in order to intrude into the network. This path list and associated information can be used by cybersecurity analysts to identify all computer network assets that require remediation in order to stop an intrusion and remove an attacker's presence from the network environment. An analyst can initiate the path feature by adjusting the filter settings 421 of the client 400, which will engage the communicator 405 and the 3D object generator 410 to create a listing of selected hosts potentially affected by the intrusion.

Figure 13A:
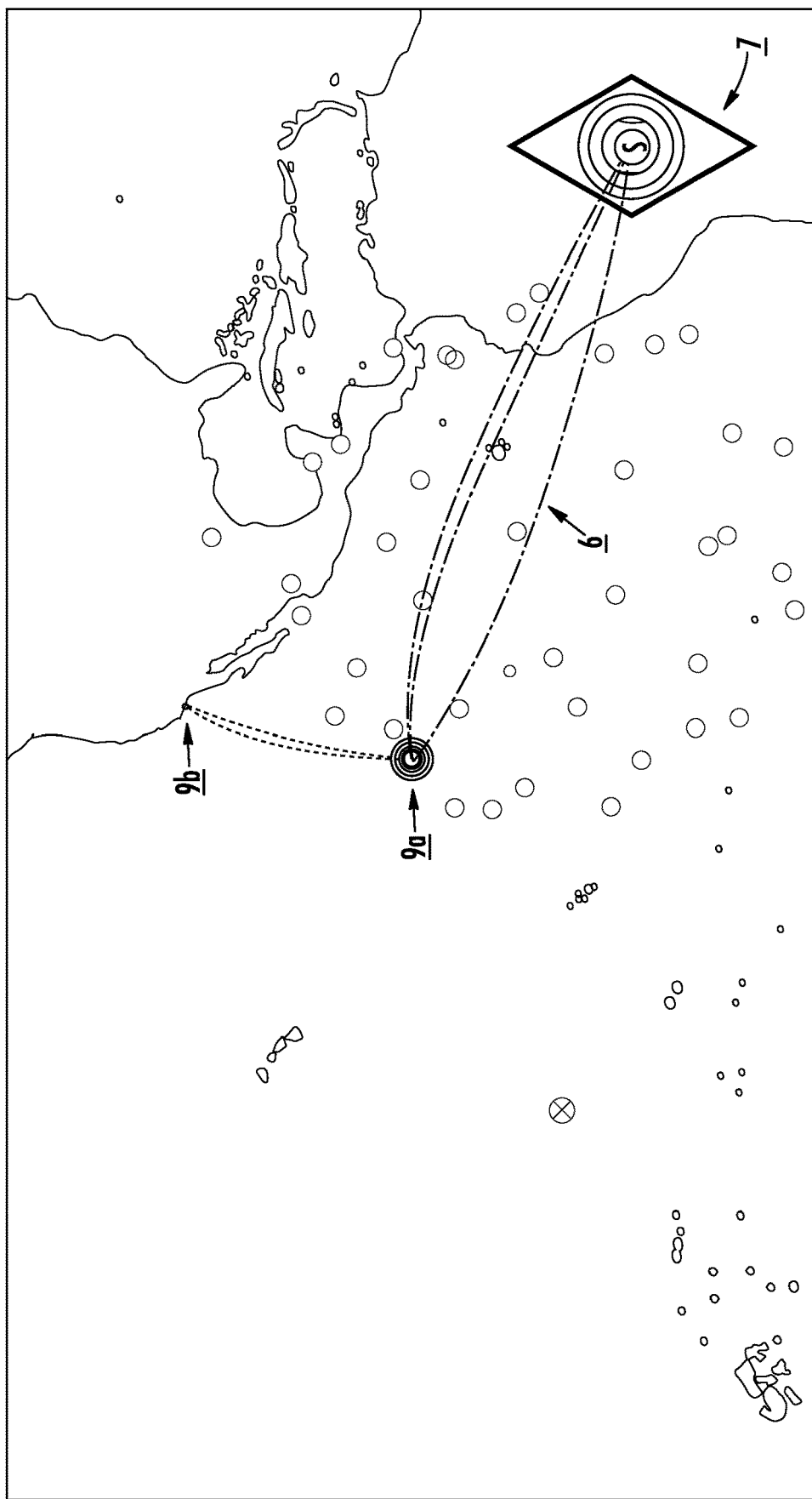
FIG. 13a is an illustration of an exemplary "onion" 3-D mixed reality environment generated by the network security monitoring and correlation system of the present invention, whereby a node is shown having a security alert associated with it and an analyst has selected nodes in the path of intrusion.
Figure 13B:
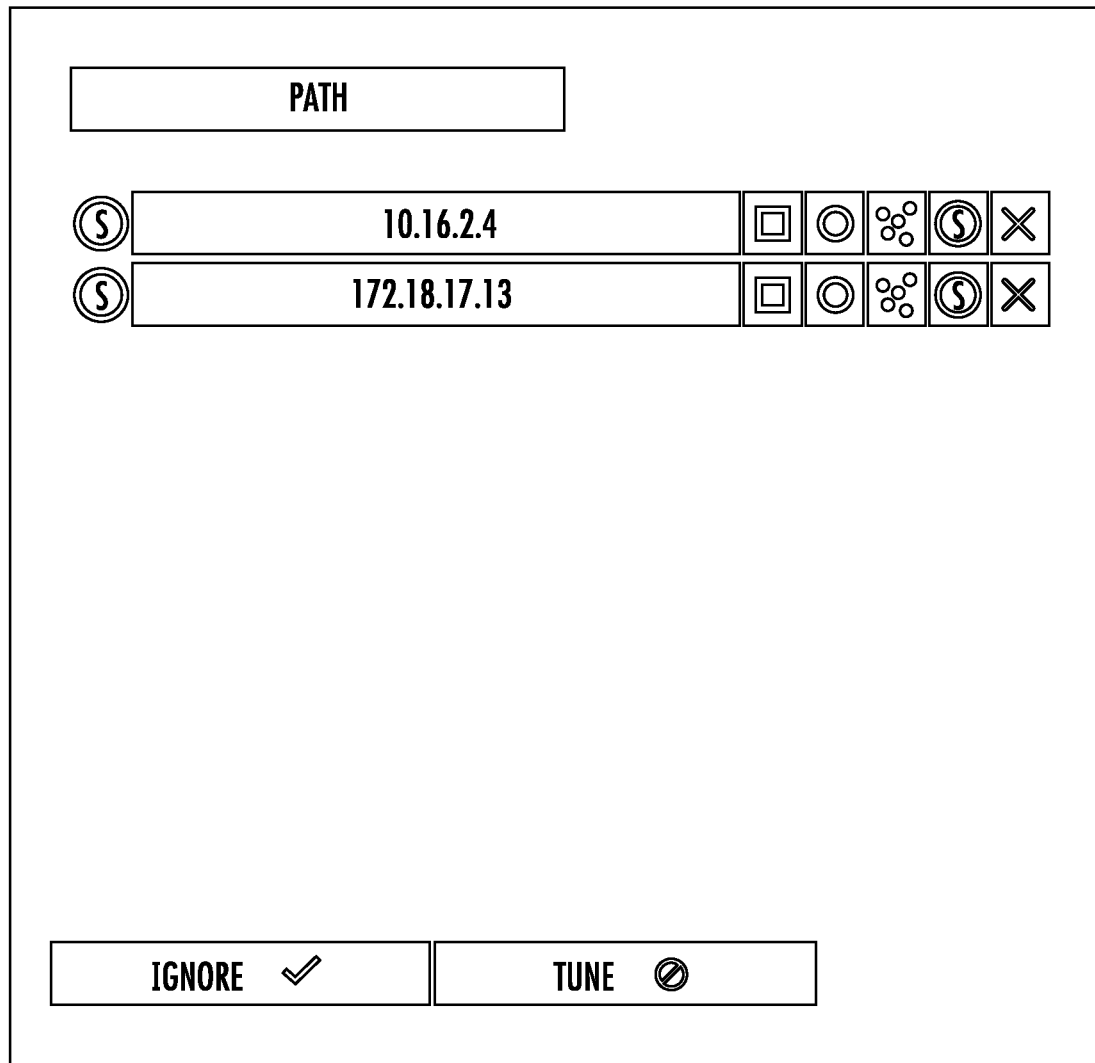
FIG. 13b is an illustration of an embodiment of a graphical user interface showing a listing of nodes in the current path list.
Figure 13C:
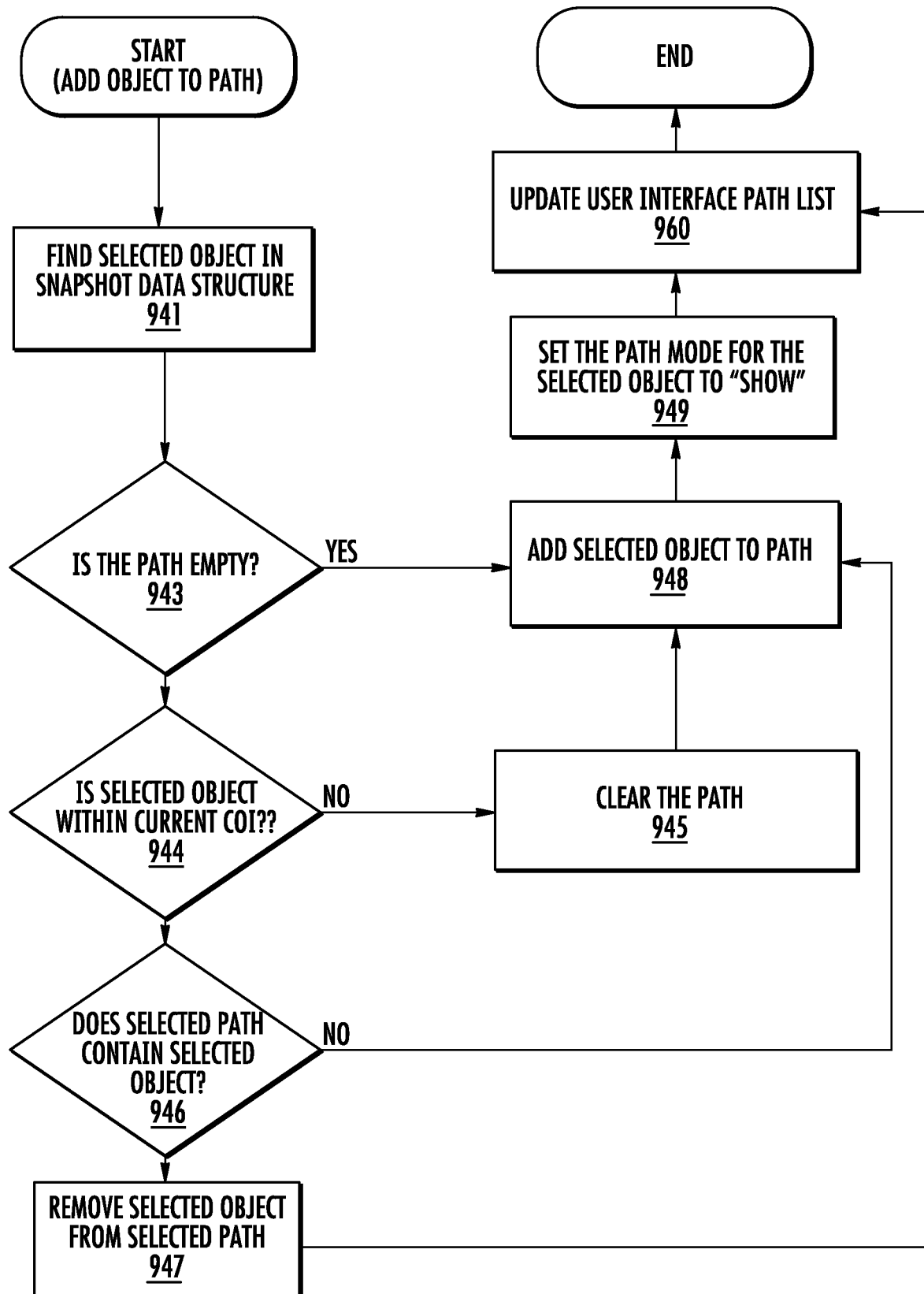
FIG. 13c is a flow diagram depicting an exemplary process enabled by the system of the present invention for applying user interface settings in a manner allowing an analyst to add nodes to the path list.
Figure 13D:
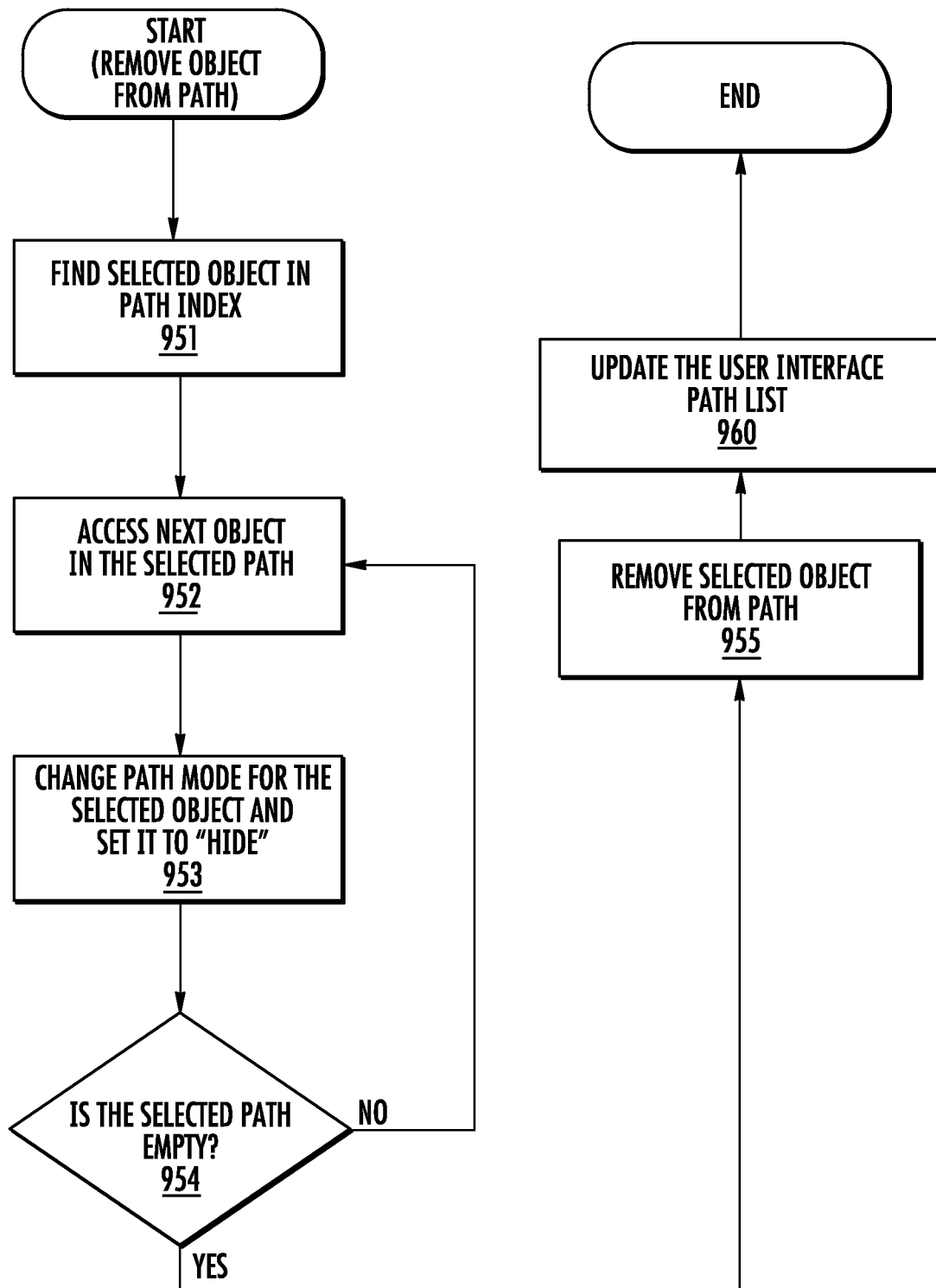
FIG. 13d is a flow diagram depicting an exemplary process enabled by the system of the present invention for applying user interface settings in a manner allowing an analyst to remove nodes from the path list.
Figure 14A:
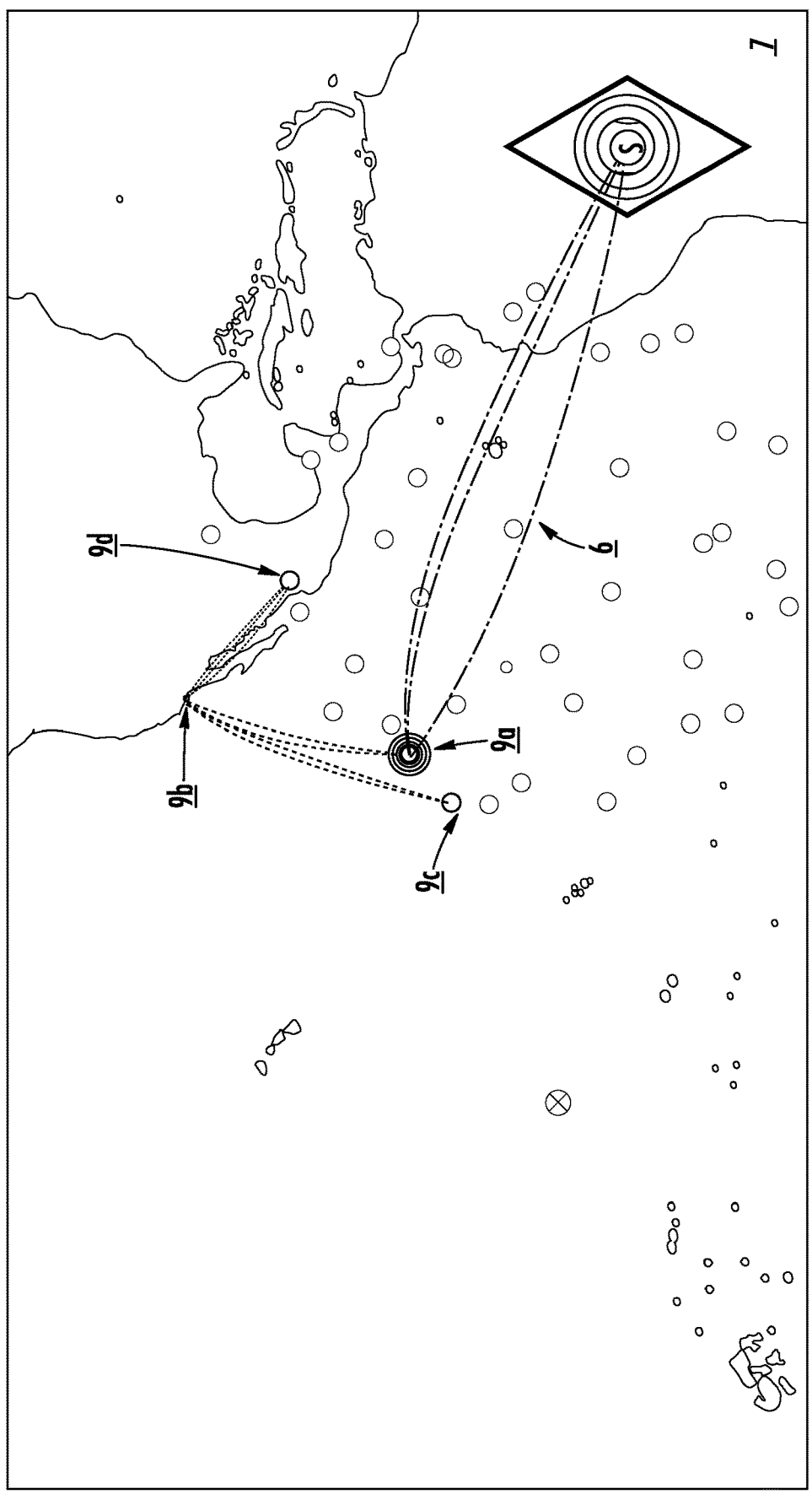
FIG. 14a is an illustration of an exemplary "onion" 3-D mixed reality environment generated by the network security monitoring and correlation system of the present invention, whereby an analyst has selected to see the community of interest associated with a selected computer host having a security alert associated with it.
Figure 14B:
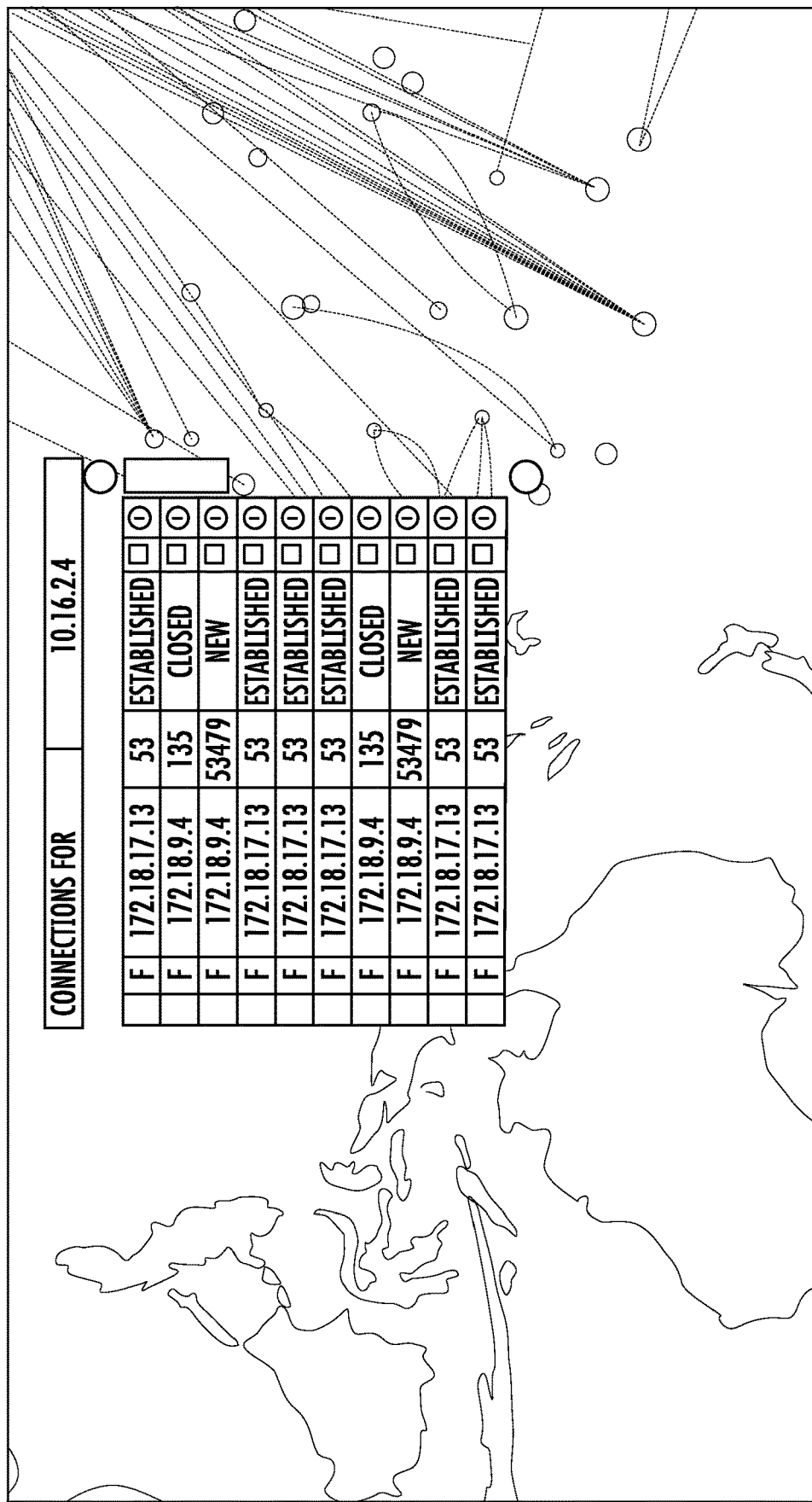

When using the path investigative tool, the analyst has the option to add selected nodes to the path (FIG. 13*c*), and remove selected nodes from the path (FIG. 13*d*). FIG. 13*a* is an illustration of an embodiment of the generated 3-D environment whereby a node is shown having a security alert associated with it and an analyst has added two nodes to the path. FIG. 13*b* is an illustration of an embodiment of a graphical user interface showing a listing of nodes in the current path list. In a preferred embodiment, the unselected nodes and their associated connections will be shown in greyscale in the environment in order to declutter the user interface 450.

Referring to FIG. 13c, an exemplary process is shown for adding a node to the path of a potential network intrusion being investigated by an analyst. In step 941, the communicator 405 will acknowledge the host selected by the analyst using the user interface 450 in the current snapshot. Next, in step 943, the communicator 405 will inquire whether the path list is empty (step 943). If the path list is empty, the communicator 405 will add the selected host to the path (step 948), load the path mode for the selected host and set the IP address for display (step 949), and then notify the user interface (step 960).

If the path list is not empty, which means that a first host has already been selected and added to the path by the analyst, the communicator 405 will inquire whether the second selected host has a community-of-interest value indicating a direct connection with the first host (step 944). If false, the communicator 405 will clear the path (step 945), will add the selected host to the path (step 948), apply a texture (i.e., an image, such as a concentric circle) to the selected host (step 949), and then notify the user interface 450 (step 960). If true, the communicator 405 will then inquire whether the path already contains the selected node (step (947). If true, the communicator 405 will cause the selected node to be removed from the path (step 947) and will then update the user interface (step 960). If false, the communicator 405 will add the selected host to the path (step 948), load the path mode for the selected host and set the IP address for display (step 949), and then notify the user interface (step 960).

Referring now to FIG. 13d, an exemplary process is shown for removing a node/host from the path of a potential network intrusion being investigated by an analyst. In step 951, the communicator 405 will find the selected node in the path index. Next, the communicator 405 will get the next host in the selected path (step 952), load the path mode for the selected host and set it to hide the IP address from display (step 953), and then inquire whether the selected path is now empty (step 954). If the selected path is not empty, the communicator 405 will repeat steps 952 through 954. If the selected path is empty, the communicator 405 will remove the node from the path (step 955) and update the path list being displayed to the analyst through the user interface 450 (step 960).

Figure 13E:
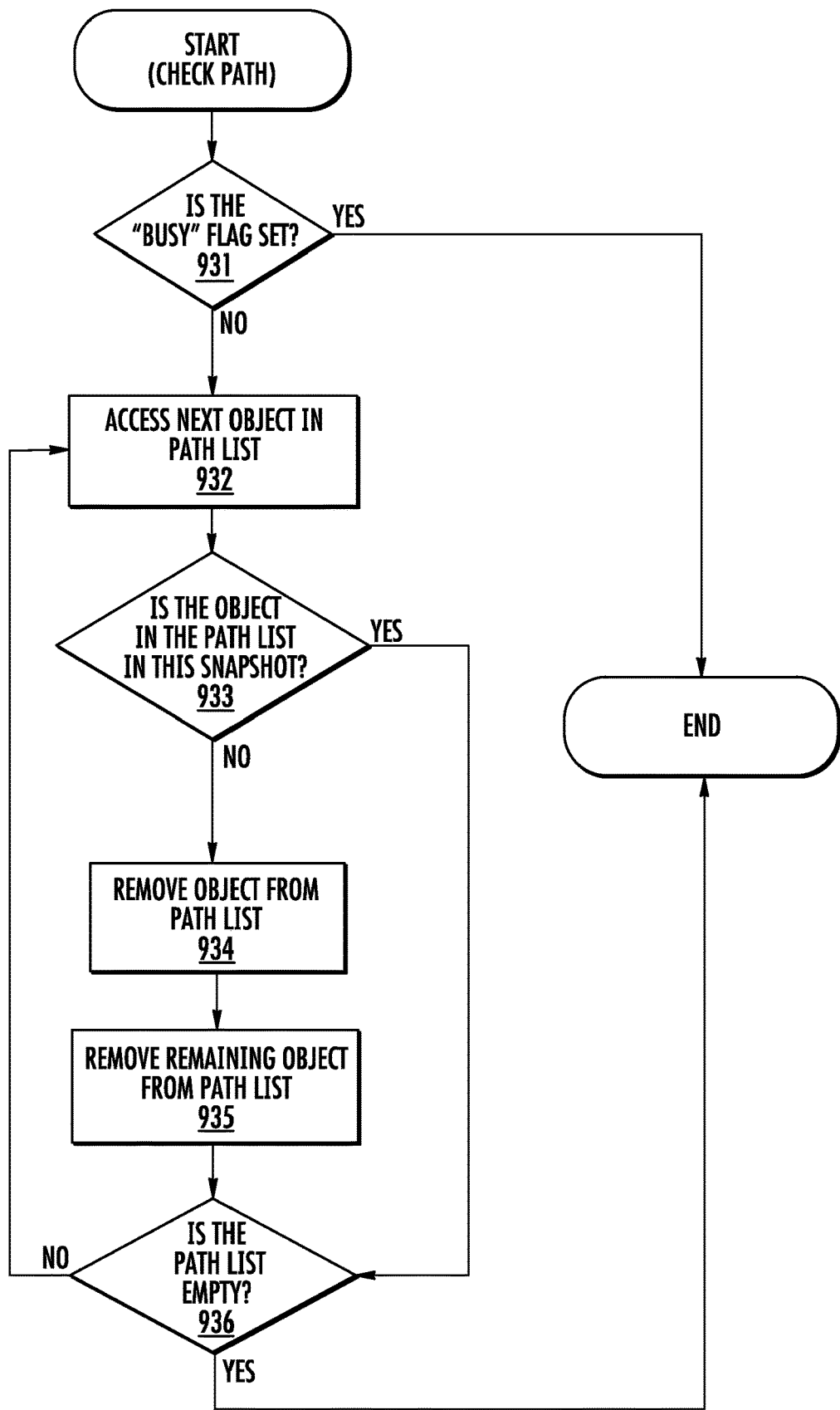
FIG. 13e is a flow diagram depicting an exemplary quality control process utilized by the system of the present invention for verifying that a connection to be visualized between two hosts exists in a new snapshot.

FIG. 13e depicts an exemplary quality control process utilized by the system of the present invention for verifying that a connection to be visualized between two hosts exists in a new snapshot. Referring to FIG. 13e, an exemplary process for checking the path of a potential network intrusion is shown. In step 931, the communicator 405 will inquire whether the background workers (i.e., the network worker 401 and the file worker 402) are running an asynchronous operation. If the background workers are not running an asynchronous operation (i.e., the system is not presently spawning nodes and connections in the 3-D environment), the communicator 405 will get the next host in the path (step 932) and then inquire whether the host is present in the snapshot (step 933). If the host is in the snapshot, the communicator will repeat steps 932 through 933. If the host is not in the snapshot, the communicator 405 will remove the host/node from the path (step 934), remove the remaining nodes from the path (step 935), and then inquire whether the path is empty (step 936). If the path is empty, the communicator will end the operation. If the path is not empty, the communicator 405 will repeat steps 932 through 936.

Another investigative tool enabled by the system 1 which is useful for investigating security alerts is referred to herein as the community-of-interest feature. An embodiment of the community-of-interest feature is shown in FIGS. 14a-14d. The community-of-interest (COI) feature allows an analyst to use link analysis to examine all computers that have directly communicated with a selected computer host, as well as all computers indirectly linked to the selected computer host by orders or degrees of separation. For example, an analyst can select a computer host in the 3-D environment, such as a computer host exhibiting an intrusion alert, and use the COI feature to visualize all hosts that communicated with the selected computer host within the snapshot timeframe. By default, the COI value is set to 1, which means that only computers with direct connections to the selected computer will be displayed within the 3-D environment. If the analyst increments the COI value to 2, all computers with one degree of separation from the subject computer (e.g. computers that communicated with computers that communicated directly with the selected computer) will be displayed as well. Further increments will highlight computers with higher degrees of separation from the selected computer host. In this manner, an analyst can use link analysis to display computers that have communicated within a computer network to a certain degree of separation, which is useful to identify a population of computer hosts that may be indirectly implicated in a cybersecurity intrusion.

Two values specific to the COI feature are used to flag data evaluated by the COI function: "crossed" and "visited". "Crossed" flags indicate that a connection between two hosts in the current snapshot has been evaluated, and "visited" flags indicate that a host in the current snapshot has been evaluated while processing COI selection requests. These flags allow the system 1 to determine which hosts will be highlighted once a COI selection is made by the user in the process detailed below.

Figure 14D:
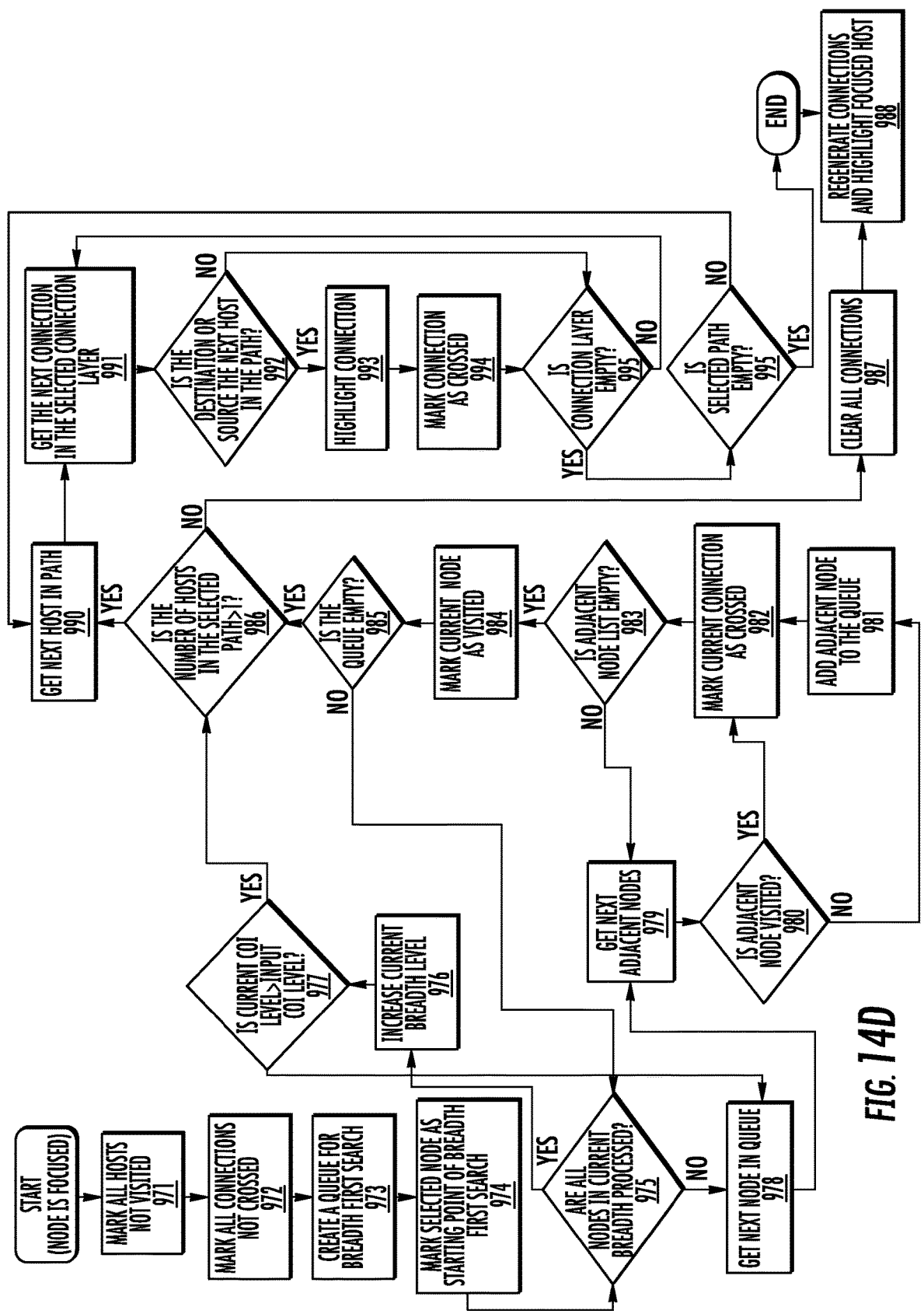
FIG. 14d is a flow diagram depicting an exemplary process enabled by the system of the present invention for applying user interface settings in a manner allowing an analyst to investigate computer hosts by orders or degrees of separation from the selected host.

FIG. 14d show an exemplary process enabled by the system 1 of the present invention for applying user interface settings in a manner allowing an analyst to use the COI investigative tool. When an analyst is utilizing the COI feature, the client 400 will be in the Focused state 908—an auxiliary state allowing the user to focus on a selected a node. Referring to FIG. 14d, the communicator 405 first will mark all hosts not visited by the analyst (step 971) and then mark all connections not crossed (step 972). Next, the communicator 405 create a queue for a Breadth First Search (i.e., is an algorithm for traversing or searching tree or graph data structures) process (step 973) and mark a selected node as the starting point (step 974). In step 975, the communicator 405 determines if it has processed all nodes in the current breadth level. If so, it will increase the current breadth level (step 976) and then check if the current breadth level is the same level as the user selected COI level (step 977). If it has not reached the target COI level, in step 978 the communicator 405 will get the next node in the queue, and then get its adjacent nodes (step 979). Next, the communicator 405 will inquire whether the adjacent node has already been visited (step 980). If the adjacent node has not been visited, the node will be added to the queue (step 981) and then the current connection will be marked as crossed (step 982). If the node has already been visited, the connection will be marked as crossed without adding the node to the queue (step 982). Next, in step 983, the communicator 405 determines if the adjacent node list is empty, and if not, repeats steps 979-982 until the adjacent queue is completely processed before marking the current node as visited in step 984.

In step 985, the communicator 405 will inquire whether the queue is empty. If not, steps 975 through 984 will be repeated until the queue is emptied. Once the queue is empty, or if the current COI level is greater than the input COI level (evaluated in step 977), the communicator 405 will inquire whether the number of hosts in the selected path is greater than one (1) (step 986). If not, the communicator 405 will clear the existing connections (step 987) and then regenerate all connections between hosts displayed in the three-dimensional environment while maintaining the focused status (step 988), and then the COI process ends.

If the number of hosts in the selected path is greater than one (1), the communicator 405 will get the next host in the path (step 990) and then get the connections for the next host in the path (step 991). Next, the communicator 405 will inquire whether the destination node or source node (i.e., the destination or source of the traced connection) is the next host in the path (step 992). If yes, the communicator 405 will highlight the connection (step 993), mark the connection as crossed (step 994), and then inquire whether the list of connections for the host is now empty (step 995). If the destination/source node is not the next host in the path, then the communicator will not highlight the connection and will instead transition immediately to the inquiry whether the list of connections is now empty (step 995). If the list of connections is not empty, steps 991 through 995 will be repeated. Once the list of connections is emptied, the communicator 405 will then inquire whether there are any additional hosts in the path (step 996), and it will repeat steps 990 through 996 until the selected path is emptied.

Many modifications and other embodiments of the invention set forth herein will come to mind to one skilled in the art having the benefit of the teaching presented in the foregoing description and associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A network monitoring system, comprising:
an application server comprising a non-transitory computer readable medium having stored thereon software instructions for programming the application server to perform server operations including:
retrieving network traffic metadata pertaining to a monitored network, wherein the monitored network comprises a private network, a public network, and an external network, with the private network, the public network, and the external network each comprising a plurality of computer hosts; and
processing the network traffic metadata by normalizing the network traffic metadata and constructing a graph data structure, the graph data structure comprising: one or more vertices representing the plurality of computer hosts existing on each of the private network, the public network, and the external network; and one or more edges representing connections between two computer hosts.

2. The network monitoring system of claim 1, wherein the process of normalizing the network traffic metadata includes extracting normalized fields metadata elements from the network traffic metadata and populating an intermediary array, wherein the normalized fields metadata elements comprise a destination host identifier, a destination host port, a source host identifier, and a source host port.

3. The network monitoring system of claim 2, wherein the processing of the network traffic metadata further includes extracting non-normalized fields metadata elements from the network traffic metadata and populating a nested array, wherein the non-normalized fields metadata elements define network traffic additional information pertaining to the one or more vertices or the one or more edges of the graph data structure.

4. The network monitoring system of claim 3, wherein the processing of the network traffic metadata further includes adding the additional network traffic information to the one or more vertices or the one or more edges of the graph data structure.

5. The network monitoring system of claim 4, wherein the software instructions for programming the application server to perform server operations further include:
retrieving discrete data pertaining to the monitored network; and
processing the discrete data by adding the discrete data to the one or more edges in the graph data structure.

6. The network monitoring system of claim 5, wherein the processing of the discrete data further includes
extracting discrete data elements from the discrete data and populating the nested array, wherein the discrete data elements define discrete data additional information pertaining to the one or more vertices or the one or more edges of the graph data structure; and
adding the discrete data additional information to the one or more vertices or the one or more edges of the graph data structure.

7. The network monitoring system of claim 6, wherein the network visualization system further comprises a client application comprising a non-transitory computer readable medium having stored thereon software instructions for programming the application server to perform client operations including: generating a three-dimensional visualization of the monitored network by parsing the graph data structure received from the application server.

8. The network monitoring system of claim 7, wherein the process of generating the three-dimensional visualization of the monitored network includes spawning the plurality of computer hosts as a first three-dimensional object in a 3-D environment.

9. The network monitoring system of claim 8, wherein the process of generating the three-dimensional visualization of the monitored network further includes spawning the connections as a second three-dimensional object in the 3-D environment.

10. The network monitoring system of claim 9, wherein the process of generating the three-dimensional visualization of the monitored network further includes representing the discrete data additional information as a particular color, a particular shape, a particular size, a particular position, or a particular changing dynamic value in the 3-D environment.

11. The network monitoring system of claim 5, wherein the process of retrieving network traffic metadata and discrete data pertaining to the monitored network includes querying a system database for network traffic metadata and discrete data collected by one or more data collectors during a snapshot timeframe and pertaining to the plurality of computer hosts existing on each of the private network, the public network, and the external network.

12. A method of monitoring a computer network, the method comprising:
- retrieving network traffic metadata pertaining to a monitored network, wherein the monitored network comprises a private network, a public network, and an external network, with the private network, the public network, and the external network each comprising a plurality of computer hosts; and
- processing the network traffic metadata by embedding the network traffic metadata into a graph data structure, the graph data structure comprising: a plurality of vertices, with each of the plurality of vertices representing one of the plurality of computer hosts existing on either the private network, the public network, or the external network; and one or more edges representing connections between two computer hosts.

13. The method of claim 12, wherein processing the network traffic metadata further includes normalizing the network traffic metadata by extracting normalized fields metadata elements from the network traffic metadata and populating an intermediary array, wherein the normalized fields metadata elements comprise a destination host identifier, a destination host port, a source host identifier, and a source host port.

14. The method of claim 13, wherein the processing of the network traffic metadata further includes extracting non-normalized fields metadata elements from the network traffic metadata and populating a nested array, wherein the non-normalized fields metadata elements define network traffic additional information pertaining to the one or more vertices or the one or more edges of the graph data structure.

15. The method of claim 14, wherein the processing of the network traffic metadata further includes adding the additional network traffic information to the one or more vertices or the one or more edges of the graph data structure.

16. The method of claim 15, further comprising:
- retrieving discrete data pertaining to the monitored network; and
- processing the discrete data by adding the discrete data to the one or more edges in the graph data structure.

17. The method of claim 16, wherein the process of retrieving network traffic metadata and discrete data pertaining to the monitored network includes querying a system database for network traffic metadata and discrete data collected by one or more data collectors during a snapshot timeframe and pertaining to the plurality of computer hosts existing on each of the private network, the public network, and the external network.

18. The method of claim 16, wherein the processing of the discrete data further includes:
- extracting discrete data elements from the discrete data and populating the nested array, wherein the discrete data elements define discrete data additional information pertaining to the one or more vertices or the one or more edges of the graph data structure; and
- adding the discrete data additional information to the one or more vertices or the one or more edges of the graph data structure.

19. The method of claim 12, further comprising:
- generating a three-dimensional visualization of the monitored network by parsing the graph data structure; and
- displaying the three-dimensional visualization of the monitored network overlaid with the discrete data.

20. The method of claim 19, wherein the process of generating the three-dimensional visualization of the monitored network includes: spawning the plurality of computer hosts as a first three-dimensional object in a 3-D environment; spawning the connections as a second three-dimensional object in the 3-D environment; and representing the discrete data additional information as a particular color, a particular shape, a particular size, a particular position, or a particular changing dynamic value in the 3-D environment.

* * * * *